US012591753B2

(12) United States Patent
Turek et al.

(10) Patent No.: US 12,591,753 B2
(45) Date of Patent: Mar. 31, 2026

(54) DETERMINING FINANCIAL RISK BASED ON CYBERSECURITY DATA FOR REMEDIATION THEREOF

(71) Applicant: Zscaler, Inc., San Jose, CA (US)

(72) Inventors: Michael Turek, Chicago, IL (US); Lisa Raymond-Smith, Chatham, NJ (US); Shanghao Chen, Burnaby (CA); Karthikeyan Thamilarasu, Cumming, GA (US); Shriyash Shete, Bloomington, IN (US); Florian Vogt, Munich (DE); Shawn Poh Wei Jian, Singapore (SG); Gary Symes, Denver, CO (US)

(73) Assignee: Zscaler, Inc., San Jose, CA (US)

( * ) Notice: Subject to any disclaimer, the term of this patent is extended or adjusted under 35 U.S.C. 154(b) by 169 days.

(21) Appl. No.: 18/535,100

(22) Filed: Dec. 11, 2023

(65) Prior Publication Data

US 2024/0422186 A1     Dec. 19, 2024

Related U.S. Application Data

(60) Provisional application No. 63/507,958, filed on Jun. 13, 2023.

(51) Int. Cl.
| | |
|---|---|
| *G06F 40/56* | (2020.01) |
| *G06F 9/451* | (2018.01) |
| *G06F 16/242* | (2019.01) |
| *G09B 5/06* | (2006.01) |
| *H04L 9/40* | (2022.01) |
| *H04L 41/16* | (2022.01) |

(52) U.S. Cl.
CPC .............. *G06F 40/56* (2020.01); *G06F 9/453* (2018.02); *G06F 16/243* (2019.01); *G09B 5/065* (2013.01); *H04L 41/16* (2013.01); *H04L 63/1408* (2013.01); *H04L 63/1433* (2013.01)

(58) Field of Classification Search
CPC .. H04L 63/1433; H04L 41/16; H04L 63/1408
USPC ......................................................... 726/25
See application file for complete search history.

(56) References Cited

U.S. PATENT DOCUMENTS

| | | | |
|---|---|---|---|
| 8,286,239 | B1 | 10/2012 | Sutton |
| 9,152,789 | B2 | 10/2015 | Natarajan et al. |

(Continued)

*Primary Examiner* — Lan Dai T Truong
(74) *Attorney, Agent, or Firm* — Baratta Law PLLC; Lawrence A. Baratta, Jr.

(57) ABSTRACT

Systems and methods for analyzing cybersecurity data to determine financial risk include obtaining cybersecurity monitoring data for an organization where the cybersecurity monitoring data is from a plurality of sources including from cybersecurity monitoring of a plurality of users associated with the organization; determining a current cyber risk posture of the organization based on the cybersecurity monitoring data; determining inputs for a Monte Carlo simulation to characterize financial losses of the organization due to a cyber event in a predetermined time period based on (1) an associated industry of the organization, (2) a size of the organization, and (3) the current cyber risk posture of the organization; performing a plurality of trials of the Monte Carlo simulation utilizing the inputs; and displaying a risk distribution curve based on results of the plurality of trials where the risk distribution curve plots a curve of losses versus a probability.

18 Claims, 22 Drawing Sheets

(56) References Cited

U.S. PATENT DOCUMENTS

| | | | |
|---|---|---|---|
| 9,609,015 B2 | 3/2017 | Natarajan et al. | |
| 10,225,740 B2 | 3/2019 | Bansal et al. | |
| 10,511,607 B2 | 12/2019 | Bansal et al. | |
| 10,728,117 B1 | 7/2020 | Sharma et al. | |
| 10,892,964 B2 | 1/2021 | Sharma et al. | |
| 11,089,047 B1 | 8/2021 | Kaushal et al. | |
| 2017/0359220 A1 | 12/2017 | Weith et al. | |
| 2019/0081981 A1 | 3/2019 | Bansal | |
| 2020/0274782 A1 | 8/2020 | Balaiah et al. | |
| 2020/0274784 A1 | 8/2020 | Sharma et al. | |
| 2021/0314338 A1 | 10/2021 | Howe | |
| 2021/0360016 A1 | 11/2021 | Kaushal et al. | |
| 2021/0409441 A1 | 12/2021 | Singh et al. | |
| 2023/0081399 A1* | 3/2023 | Murphy | G06Q 10/06395 |
| | | | 705/7.42 |
| 2023/0164183 A1 | 5/2023 | Kothari et al. | |
| 2023/0171280 A1 | 6/2023 | Bansal et al. | |
| 2023/0370495 A1 | 11/2023 | Desai et al. | |
| 2023/0412620 A1* | 12/2023 | Crabtree | H04L 63/1416 |
| 2024/0126892 A1* | 4/2024 | Bolukbas | G06F 21/577 |
| 2024/0348640 A1* | 10/2024 | King-Wilson | H04L 63/1433 |

* cited by examiner

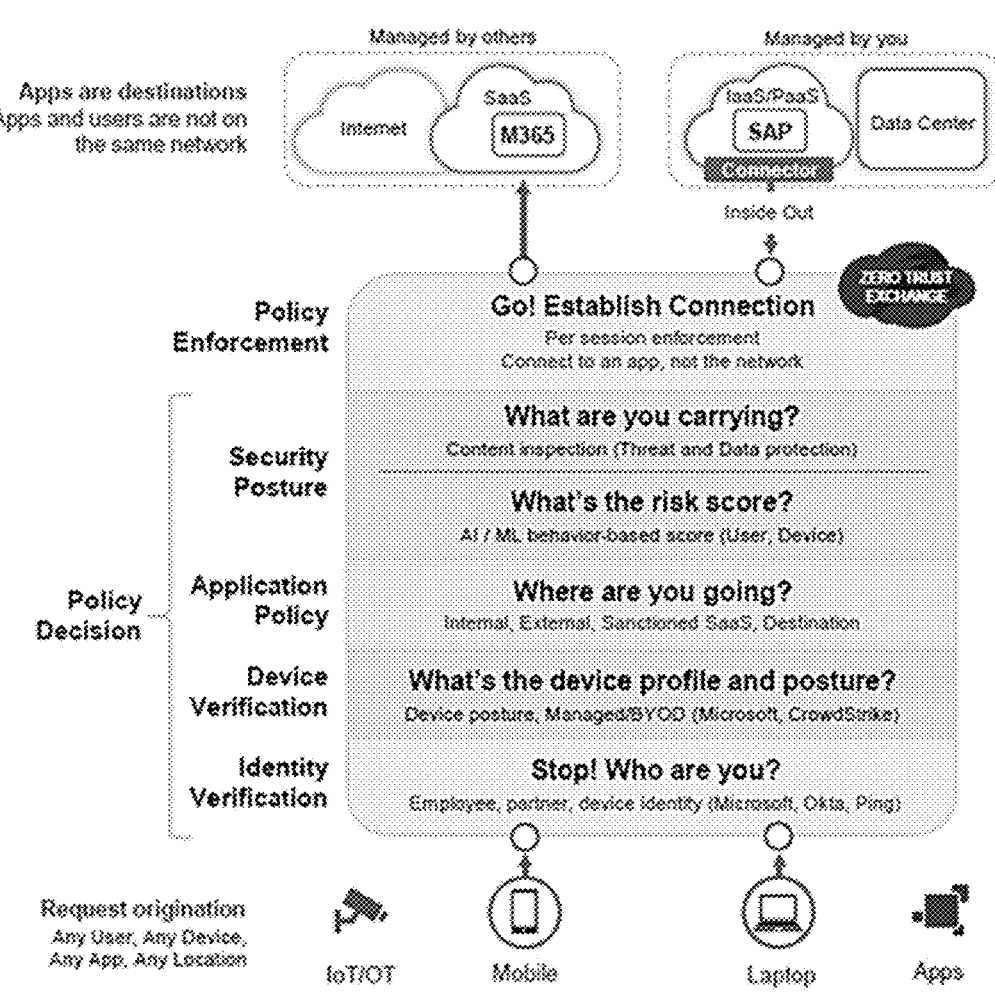
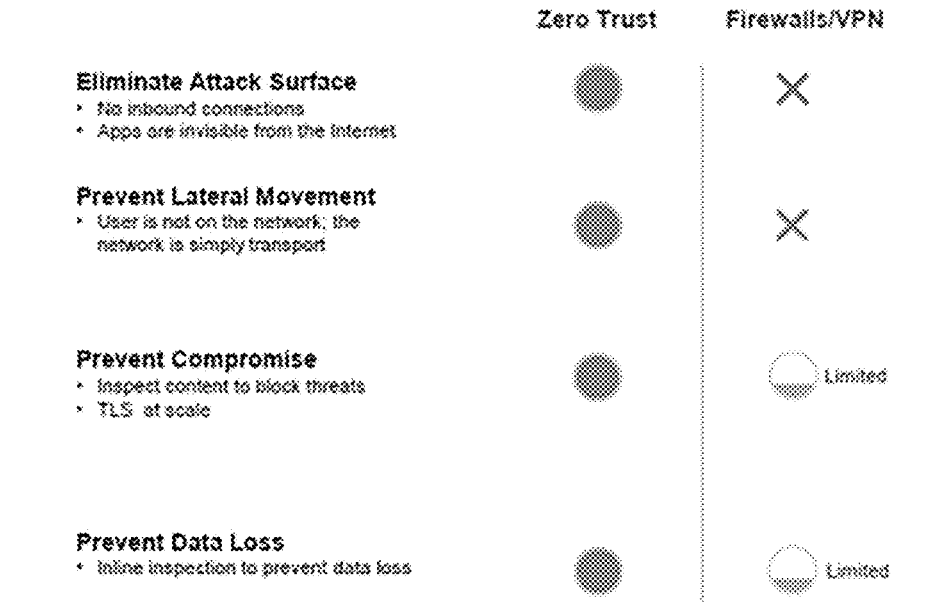
FIG. 1C

340

ANALYZE A NETWORK TO MEASURE SECURITY PARAMETERS ASSOCIATED WITH THE USE OF ONE OR MORE NETWORK SECURITY TOOLS THAT ARE CONFIGURED FOR MITIGATING RISK WITH RESPECT TO NETWORK COMPROMISE, LATERAL MOVEMENT, DATA LOSS, AND ASSET EXPOSURE ⟋342

BASED ON THE MEASURED SECURITY PARAMETERS, QUANTIFY THE ONE OR MORE NETWORK SECURITY TOOLS TO DETERMINE AN EFFECTIVENESS SCORE DEFINING AN ABILITY OF THE ONE OR MORE NETWORK SECURITY TOOLS, IN COMBINATION, TO COUNTERACT THE NEWORK COMPROMISE, LATERAL MOVEMENT, DATA LOSS, AND ASSET EXPOSURE ⟋344

FIG. 5

| Contributing Factors | Threat Protection Status | Risk Contribution | Action |
|---|---|---|---|
| ˅ Advanced Threat Protection | Not Protected | +13.5 | Edit Policy |
| DETAILS | | | |
| RULE NAME | RECOMMENDATION | | |
| Expired License | Zscaler Reccomends enabling Advanced Threat Protection Policy to protect your traffic against Botnet, Malicious Active Content, Fraud, Unauthorized communication, Cross-Site Scripting (XSS), Suspicious Destinations, and P2P file sharing. Please click here to learn more and contact your Account Team. | | |
| ˅ Malware Protection | Moderately Protected | +8.25 | Edit Policy |
| DETAILS | | | |
| RULE NAME | RECOMMENDATION | | ACTION |
| Security Exceptions | Block unscannable file types | | Apply Changes |
| > Advanced URL Filtering Settings | Minimally Protected | +5 | Edit Policy |
| ˅ URL Filtering Settings | Moderately Protected | +2.75 | Edit Policy |
| DETAILS | | | |
| RULE NAME | RECOMMENDATION | | ACTION |
| Remote Marketing Team | Fields         Values to Select<br>URL Categories   Not Suitable, Legal Liability, Privacy Risk<br>Action           Block | | Apply Changes |

FIG. 8

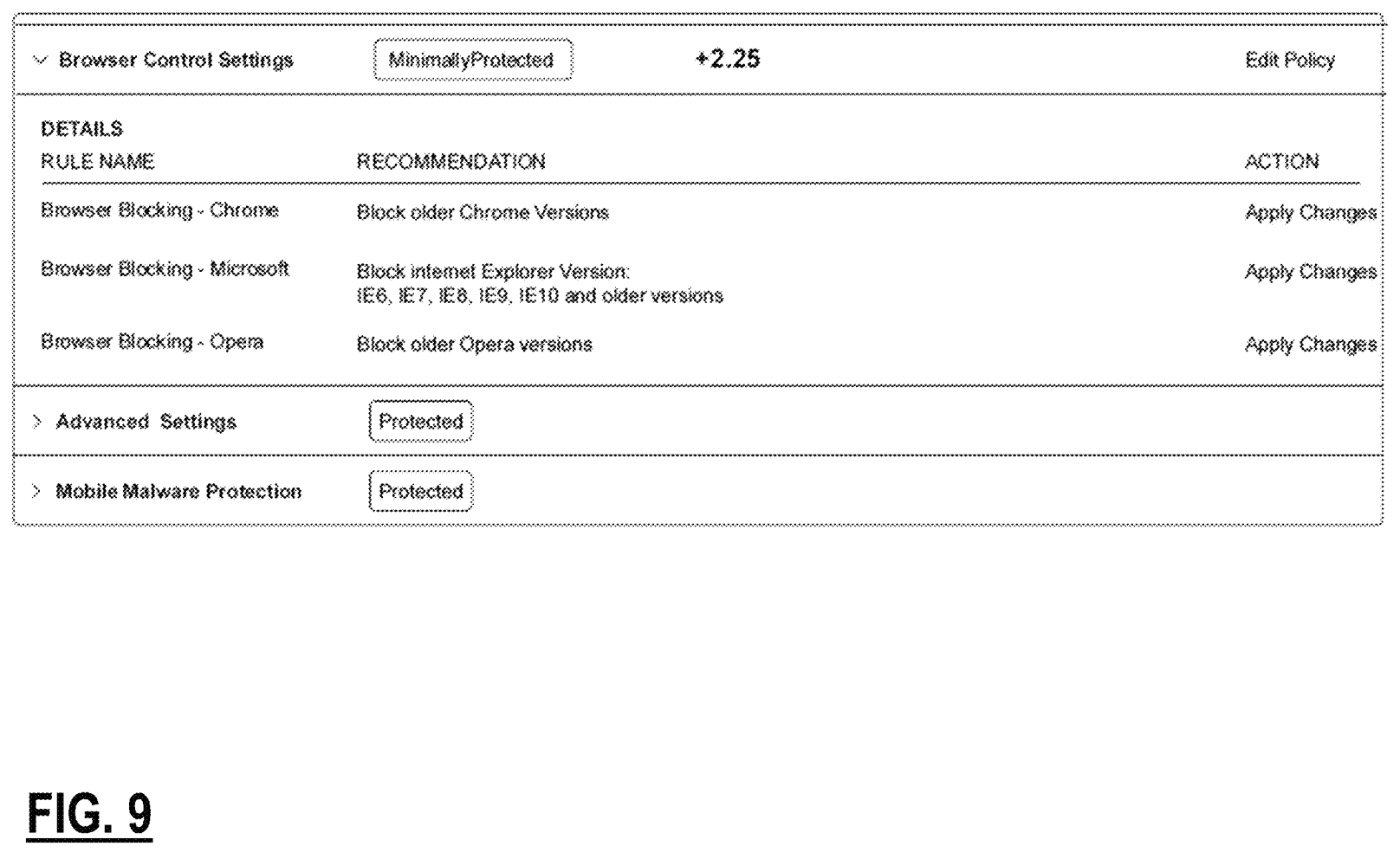

∨ Browser Control Settings    MinimallyProtected    +2.25    Edit Policy

DETAILS
RULE NAME    RECOMMENDATION    ACTION

Browser Blocking - Chrome    Block older Chrome Versions    Apply Changes

Browser Blocking - Microsoft    Block internet Explorer Version:    Apply Changes
IE6, IE7, IE8, IE9, IE10 and older versions Browser Blocking - Opera    Block older Opera versions    Apply Changes ∧ Advanced Settings    Protected ∧ Mobile Malware Protection    Protected

FIG. 9

Figure 10:
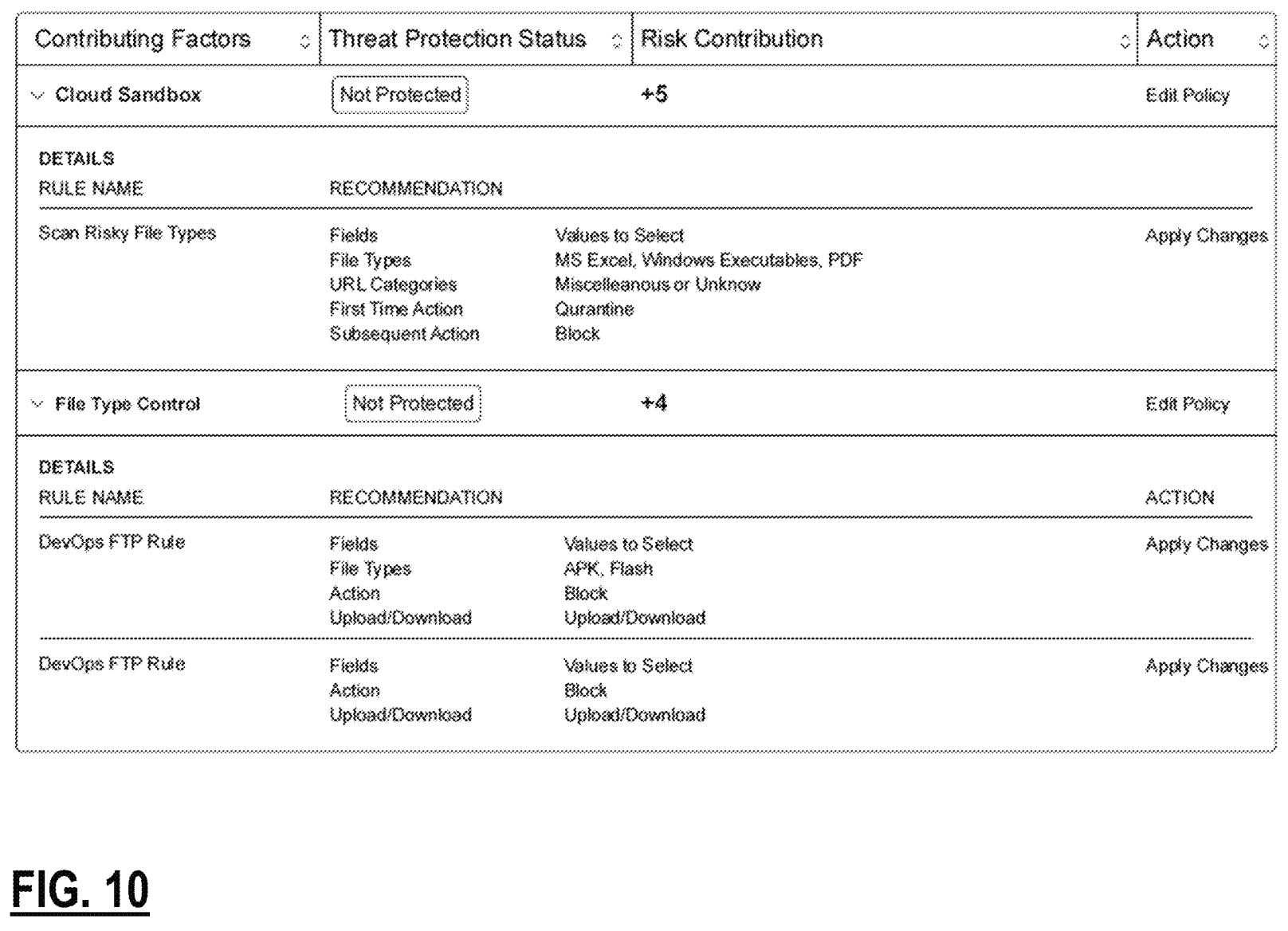

| Contributing Factors | Threat Protection Status | Risk Contribution | Action |
|---|---|---|---|
| ∨ Cloud Sandbox | Not Protected | +5 | Edit Policy |

DETAILS
RULE NAME     RECOMMENDATION     Apply Changes

Scan Risky File Types

| Fields | Values to Select |
|---|---|
| File Types | MS Excel, Windows Executables, PDF |
| URL Categories | Miscellaneous or Unknown |
| First Time Action | Quarantine |
| Subsequent Action | Block |

| ∨ File Type Control | Not Protected | +4 | Edit Policy |

DETAILS
RULE NAME     RECOMMENDATION     ACTION

DevOps FTP Rule

| Fields | Values to Select |
|---|---|
| File Types | APK, Flash |
| Action | Block |
| Upload/Download | Upload/Download |

Apply Changes

DevOps FTP Rule

| Fields | Values to Select |
|---|---|
| Action | Block |
| Upload/Download | Upload/Download |

Apply Changes

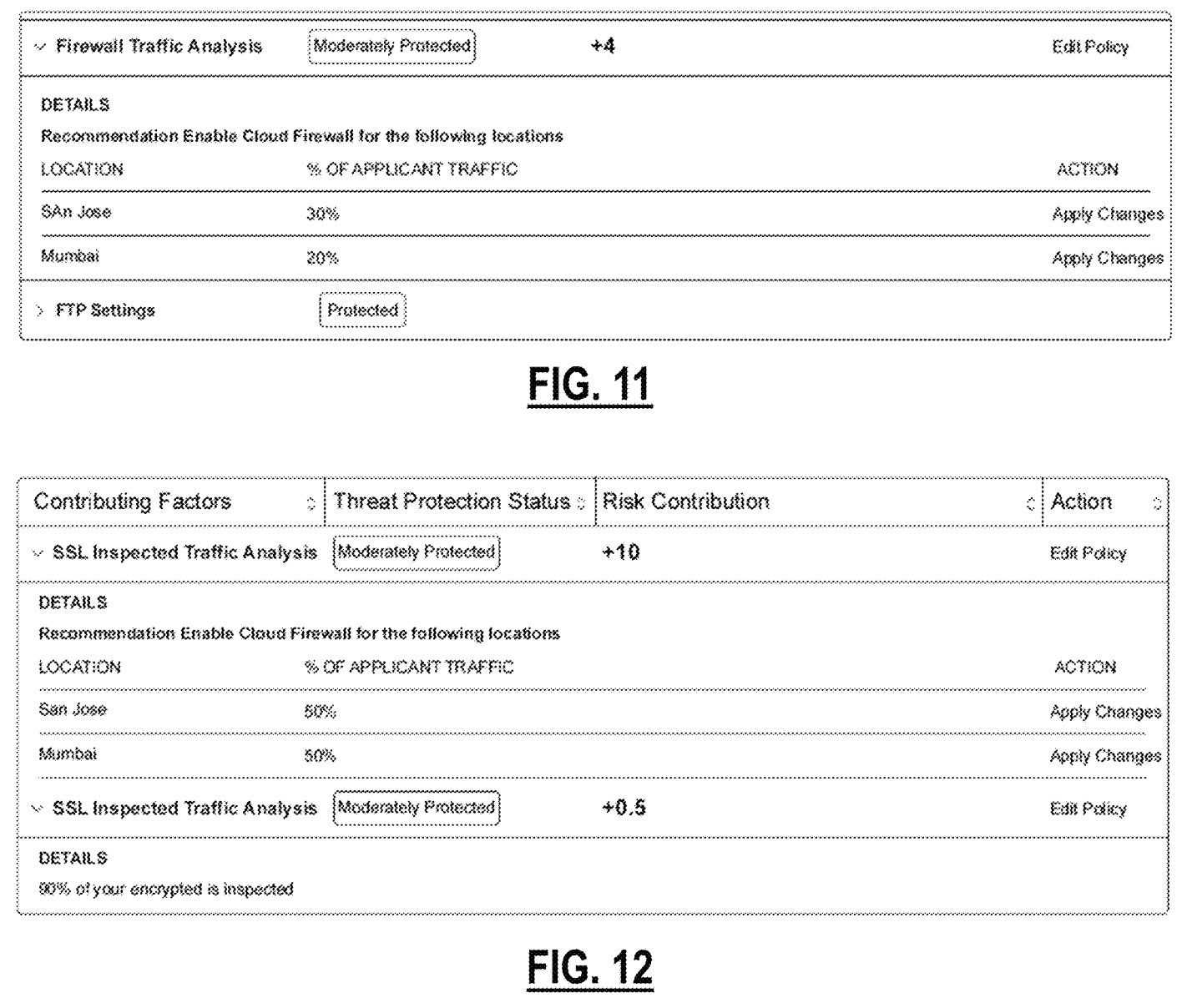

Firewall Traffic Analysis    [Moderately Protected]    +4    Edit Policy

DETAILS
Recommendation Enable Cloud Firewall for the following locations

| LOCATION | % OF APPLICANT TRAFFIC | ACTION |
| --- | --- | --- |
| San Jose | 30% | Apply Changes |
| Mumbai | 20% | Apply Changes |

FTP Settings    [Protected]

FIG. 12

| Contributing Factors | Threat Protection Status | Risk Contribution | Action |
| --- | --- | --- | --- |
| SSL Inspected Traffic Analysis | [Moderately Protected] | +10 | Edit Policy |

DETAILS
Recommendation Enable Cloud Firewall for the following locations

| LOCATION | % OF APPLICANT TRAFFIC | ACTION |
| --- | --- | --- |
| San Jose | 50% | Apply Changes |
| Mumbai | 50% | Apply Changes |

SSL Inspected Traffic Analysis    [Moderately Protected]    +0.5    Edit Policy

DETAILS
90% of your encrypted is inspected

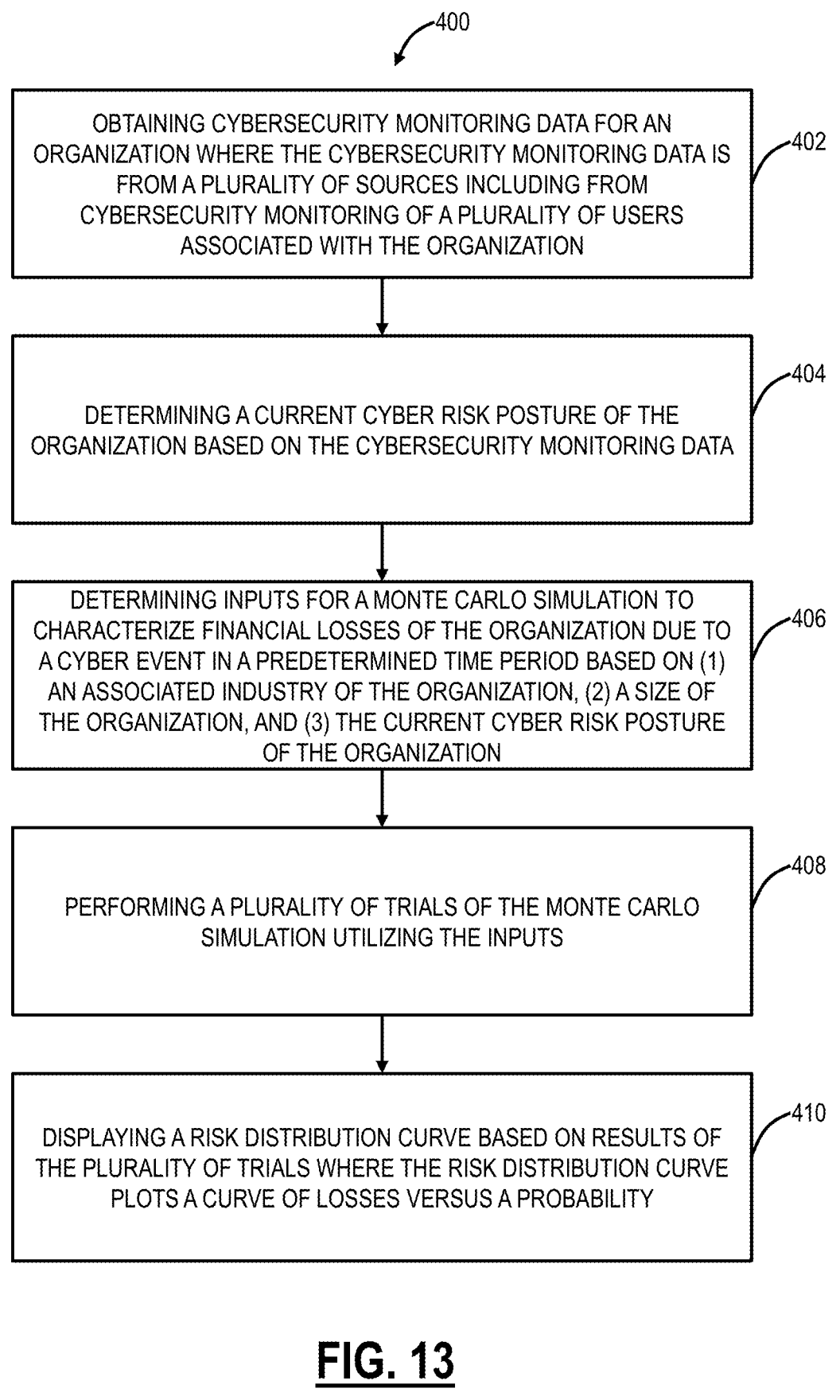

400

OBTAINING CYBERSECURITY MONITORING DATA FOR AN ORGANIZATION WHERE THE CYBERSECURITY MONITORING DATA IS FROM A PLURALITY OF SOURCES INCLUDING FROM CYBERSECURITY MONITORING OF A PLURALITY OF USERS ASSOCIATED WITH THE ORGANIZATION — 402

DETERMINING A CURRENT CYBER RISK POSTURE OF THE ORGANIZATION BASED ON THE CYBERSECURITY MONITORING DATA — 404

DETERMINING INPUTS FOR A MONTE CARLO SIMULATION TO CHARACTERIZE FINANCIAL LOSSES OF THE ORGANIZATION DUE TO A CYBER EVENT IN A PREDETERMINED TIME PERIOD BASED ON (1) AN ASSOCIATED INDUSTRY OF THE ORGANIZATION, (2) A SIZE OF THE ORGANIZATION, AND (3) THE CURRENT CYBER RISK POSTURE OF THE ORGANIZATION — 406

PERFORMING A PLURALITY OF TRIALS OF THE MONTE CARLO SIMULATION UTILIZING THE INPUTS — 408

DISPLAYING A RISK DISTRIBUTION CURVE BASED ON RESULTS OF THE PLURALITY OF TRIALS WHERE THE RISK DISTRIBUTION CURVE PLOTS A CURVE OF LOSSES VERSUS A PROBABILITY — 410

FIG. 13

| Risk Name | Probability of a Loss Over 1 Year | Lower Bound | Upper Bound | Future Probability after Mitigation |
|---|---|---|---|---|
| Data Loss | 10.7% | $211,000 | $13,000,000 | 4.1% |
| External Attack Surface | 7.3% | $211,000 | $13,000,000 | 5.5% |
| Lateral Propagation | 15.2% | $211,000 | $13,000,000 | 2.1% |
| Prevent Compromise | 13.8% | $211,000 | $13,000,000 | 1.8% |

Note: Generic values for illustrative purposes only

Annual Business Risk Reduction benefit quantification

| Cyber Attack Threat Landscape Comparison | Incident Probability (%)¹ | Potential Incident Impact ($)² |
|---|---|---|
| 1. _Benchmark Risk Profile_: Healthcare sector, $10B-$100B annual revenue | 18.1% | $0.21M - 13M |
| 2. _Current Risk Profile_: Accounting for current state risk mitigation measures | 11.8% | $1.3M |
| 3. _Optimal Risk Profile_: Accounting for future state risk mitigation based on Top 10 factor remediation | 3.4% | $0.4M |
| Delta of moving from current to future state³ | | ↓$0.9M |

Improved Risk Reduction of

71% with Zscaler

FIG. 16

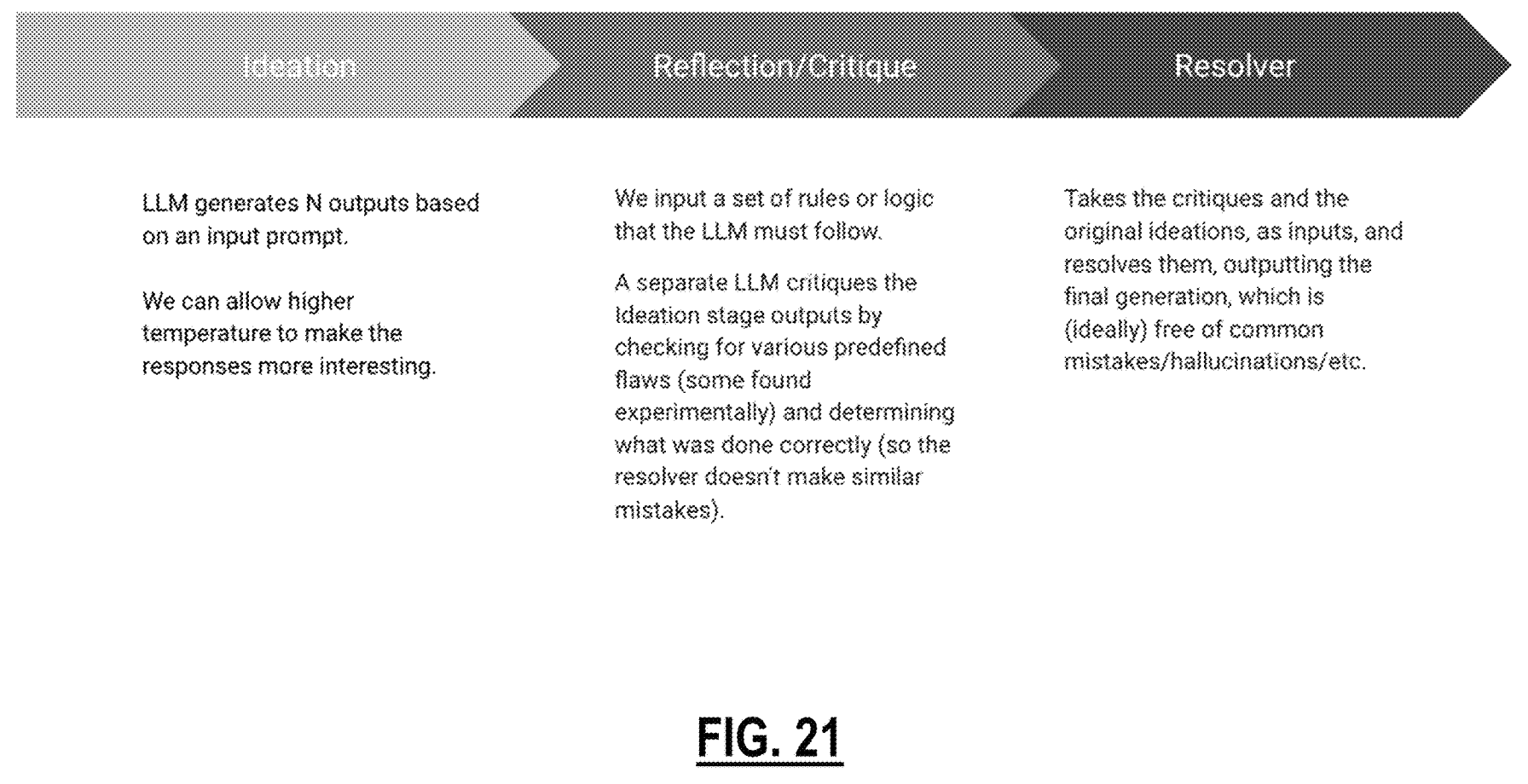

Ideation

LLM generates N outputs based on an input prompt.

We can allow higher temperature to make the responses more interesting.

Reflection/critique

We input a set of rules or logic that the LLM must follow.

A separate LLM critiques the ideation stage outputs by checking for various predefined flaws (some found experimentally) and determining what was done correctly (so the resolver doesn't make similar mistakes).

Resolver

Takes the critiques and the original ideations, as inputs, and resolves them, outputting the final generation, which is (ideally) free of common mistakes/hallucinations/etc.

FIG. 21

1. Executive Summary - risk score of 22.2 (compared to peers at 48.9)

Organization Risk Score

XYZ's overall cybersecurity risk score is 22.2, which is significantly lower than its peers. The risk score translates to the company being approximately 78% of the way in achieving its zero trust journey. This report lays out the key findings related to XYZ's cybersecurity posture.

The External Attack Surface Risk Score of 25.0 is lower than the peer score of 60.1, due to a relatively low amount of exposed servers compared to peers who have higher risk due to detected VPNs and outdated, exposed servers. The Data Loss Risk Score is 6.7, which is lower than the peer score of 40.5, because the company is not using risky applications as actively as its peers, reducing the risk of data loss. XYZ's Financial Risk is $8,375,538 which is lower than peers at $38,975,215.

Key statistics on XYZ's cybersecurity architecture rollout:

* XYZ has successfully rolled out ZIA for all users, with key features such as Sandbox Advanced with AI Quarantine enabled. There are configured 14 Sandbox rules (compared to 3 for peers), 85 Firewall rules (compared to 82 by peers), and 2,454 DNS rules (compared to 9 by peers). XYZ also has over 40 advanced threat settings enabled, including the detection and blocking of anonymizers, C2 traffic, SSH tunneling, and adware/spyware.

* XYZ has also rolled out ZPA to all users, for robust zero trust access to private applications. The company is at the beginning of the segmentation journey, having configured 36 application segments (compared to peers with 104) and 16 policies (compared to peers at 58).

has made good progress in in securing its cyber environment, though there is still work to be done. Some high impact recommendations are as follows. XYZ should discontinue the use of VPN services to curtail the risk of lateral propagation. It is also recommended that XYZ establish posture across all application segments. To further bolster its cybersecurity framework, XYZ should configure application decoys for generating high fidelity alerts.

Figure 23:
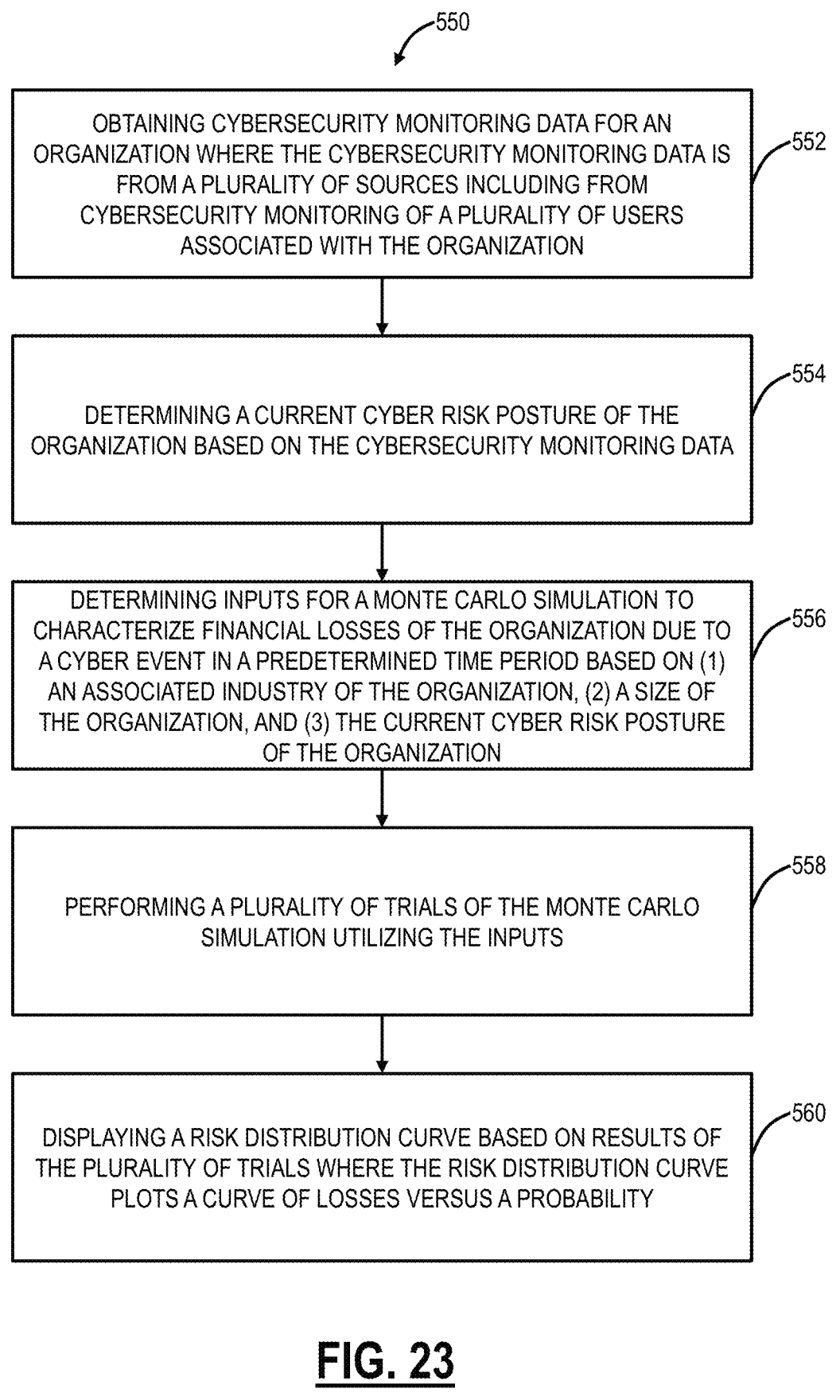

OBTAINING CYBERSECURITY MONITORING DATA FOR AN ORGANIZATION WHERE THE CYBERSECURITY MONITORING DATA IS FROM A PLURALITY OF SOURCES INCLUDING FROM CYBERSECURITY MONITORING OF A PLURALITY OF USERS ASSOCIATED WITH THE ORGANIZATION

552

DETERMINING A CURRENT CYBER RISK POSTURE OF THE ORGANIZATION BASED ON THE CYBERSECURITY MONITORING DATA

554

DETERMINING INPUTS FOR A MONTE CARLO SIMULATION TO CHARACTERIZE FINANCIAL LOSSES OF THE ORGANIZATION DUE TO A CYBER EVENT IN A PREDETERMINED TIME PERIOD BASED ON (1) AN ASSOCIATED INDUSTRY OF THE ORGANIZATION, (2) A SIZE OF THE ORGANIZATION, AND (3) THE CURRENT CYBER RISK POSTURE OF THE ORGANIZATION

556

PERFORMING A PLURALITY OF TRIALS OF THE MONTE CARLO SIMULATION UTILIZING THE INPUTS

558

DISPLAYING A RISK DISTRIBUTION CURVE BASED ON RESULTS OF THE PLURALITY OF TRIALS WHERE THE RISK DISTRIBUTION CURVE PLOTS A CURVE OF LOSSES VERSUS A PROBABILITY

DETERMINING FINANCIAL RISK BASED ON CYBERSECURITY DATA FOR REMEDIATION THEREOF

CROSS-REFERENCE TO RELATED APPLICATION(S)

The present disclosure claims priority to U.S. Provisional Patent Application 63/507,958, filed Jun. 13, 2023, entitled "Risk analysis and modeling through a cloud-based system," the contents of which are incorporated by reference in its entirety herein.

FIELD OF THE DISCLOSURE

The present disclosure generally relates to computer networking systems and methods, particularly focused on cybersecurity risk. More particularly, the present disclosure relates to systems and methods for analyzing cybersecurity data to determine financial risk as well as using Large Language Models (LLMs) to generate an Artificial Intelligence (AI) report on security risk using the cybersecurity data.

BACKGROUND OF THE DISCLOSURE

At present there is a challenge in measuring, quantifying and remediating risk associated with Information Technology (IT) resources. Internal research shows that customers manage risk through not so good third-party tools or manual input spreadsheets. Due to the lack Industry standards for risk quantification tools, the space is completely open. There are various different security areas and techniques, such as preventing compromise, preventing lateral movement, preventing data loss, minimizing the attack surface, and the like. Siloed security tools paint an incomplete picture of cyber risks and give no meaningful way to remediate them. Evolving cyberthreats are giving threat actors more ways to approach an organization's attack surface and breach security, and siloed security tools make it impossible for security leaders to holistically assess risk or thoroughly investigate incidents. As such, more businesses are being disrupted, brands are more vulnerable to damage, and the risk of long-term financial impact has never been higher.

There needs to be a unified approach to provide security stakeholders (IT, C-level executives, etc.) a higher-level view about their organization with capability to look into factors which can tremendously impact their risk and provide them necessary knowledge for area of improvements, remediation, investment, etc.

BRIEF SUMMARY OF THE DISCLOSURE

The present disclosure relates to systems and methods for analyzing cybersecurity data in a comprehensive risk quantification and visualization framework. In particular, the cybersecurity data is real data from various sources used to generate insights about potential cyber risks and their estimated financial impact.

In an embodiment, a method includes obtaining cybersecurity monitoring data for an organization where the cybersecurity monitoring data is from a plurality of sources including from cybersecurity monitoring of a plurality of users associated with the organization; determining a current cyber risk posture of the organization based on the cybersecurity monitoring data; determining inputs for a Monte Carlo simulation to characterize financial losses of the organization due to a cyber event in a predetermined time period based on (1) an associated industry of the organization, (2) a size of the organization, and (3) the current cyber risk posture of the organization; performing a plurality of trials of the Monte Carlo simulation utilizing the inputs; and displaying a risk distribution curve based on results of the plurality of trials where the risk distribution curve plots a curve of losses versus a probability.

In another embodiment, a method includes obtaining cybersecurity monitoring data for an organization where the cybersecurity monitoring data is from a plurality of sources including from cybersecurity monitoring of a plurality of users associated with the organization; inputting the cybersecurity monitoring data to a first Large Language Model (LLM) to generate an initial output for a security report; inputting the initial output to a second LLM for critiquing the initial output against a set of rules to check for predefined flaws and to check for what was done correctly to generate a critique; resolving the initial output and the critique to generate a final output; and providing the final output for the security report.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a logical diagram illustrating zero trust policies with the cloud in FIG. 1A and a comparison with the conventional firewall-based approach (appliance).

FIG. 5 is a flowchart of a process for determining the effectiveness of combination of security components for mitigating risk in a network.

FIGS. 7-12 are a series of screenshots of another user interface for displaying risk.

FIG. 13 is a flowchart of a process of financially modeling cyber risk.

FIG. 14 is a graph of a risk distribution curve.

FIG. 16 is a table illustrating risk reduction quantification.

FIG. 21 is a diagram of the three-stage framework if ideation, reflection/critique, and resolver.

FIG. 22 for an example of an executive summary generated as described herein.

FIG. 23 is a flowchart of a process for using Large Language Models (LLMs) to generate an Artificial Intelligence (AI) report on security risk using the cybersecurity data.

DETAILED DESCRIPTION OF THE DISCLOSURE

Again, the present disclosure relates to systems and methods for analyzing cybersecurity data in a comprehensive risk quantification and visualization framework. The approach described herein provides a new paradigm for managing and quantifying cybersecurity risk. The present disclosure addresses the question of how I quantify my cybersecurity risk.

§ 1.0 Cybersecurity Monitoring and Protection Examples

Figure 1A:
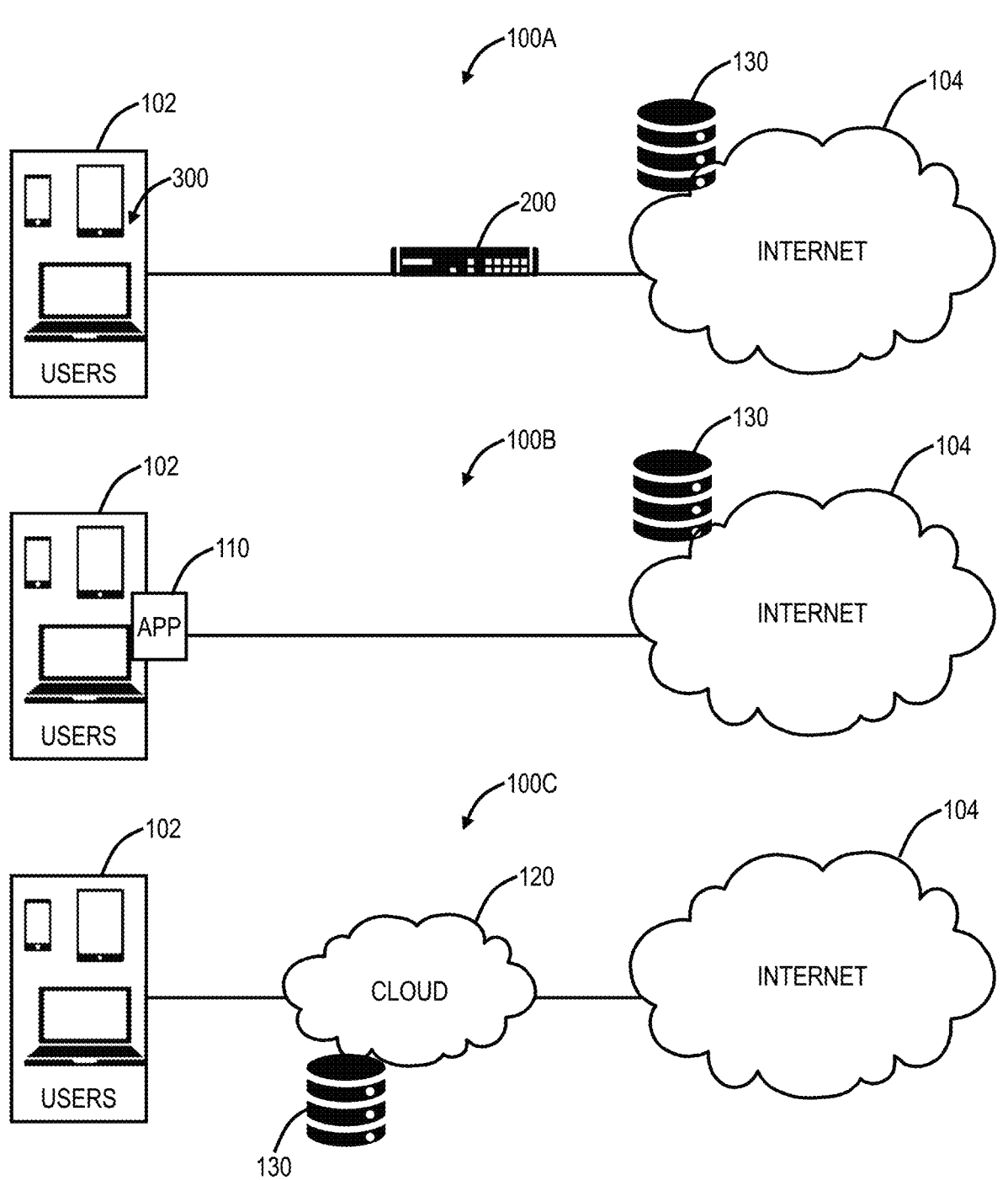
FIG. 1A is a network diagram of three example network configurations of cybersecurity monitoring of a user.
Figure 2:
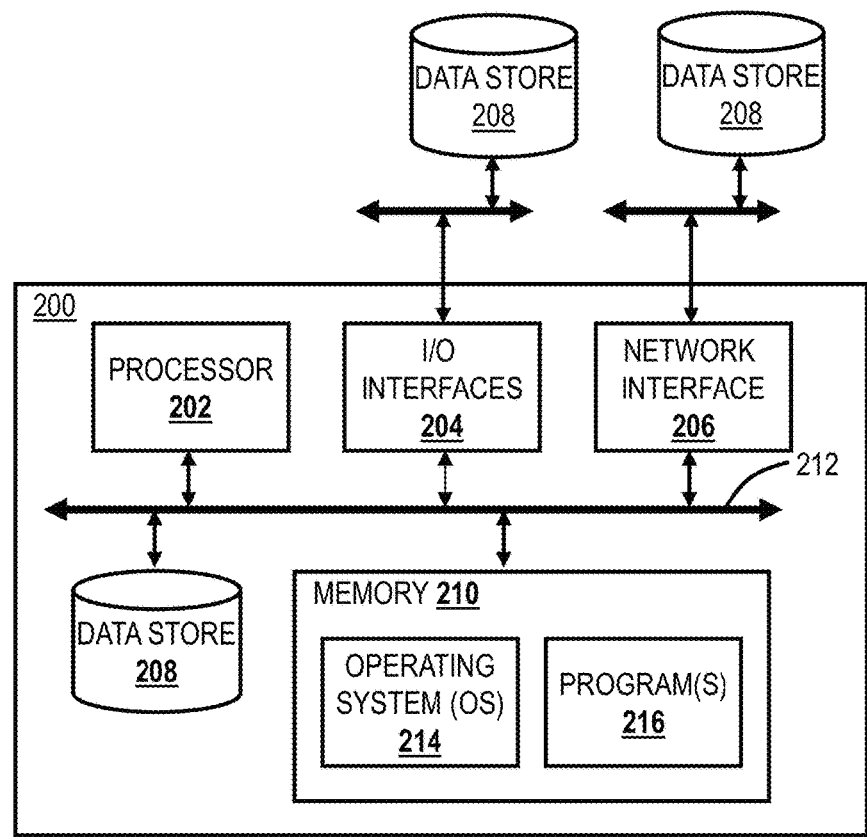
FIG. 2 is a block diagram of a server.
Figure 3:
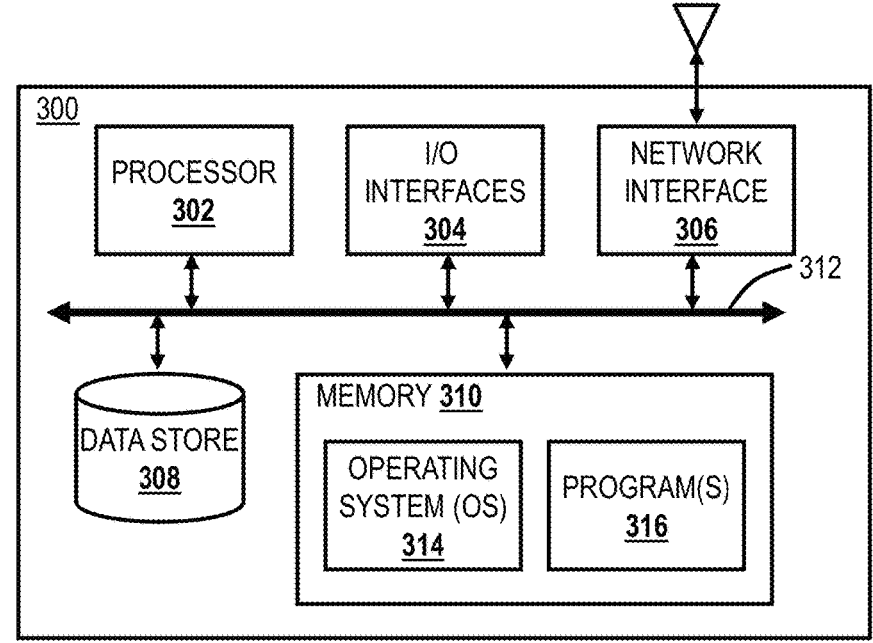
FIG. 3 is a block diagram of a user device.

FIG. 1A is a network diagram of three example network configurations 100A, 100B, 100C of cybersecurity monitoring and protection of a user 102. Those skilled in the art will recognize these are some examples for illustration purposes, there may be other approaches to cybersecurity monitoring, and these various approaches can be used in combination with one another as well as individually. Also, while shown for a single user 102, practical embodiments will handle a large volume of users 102, including multi-tenancy. In this example, the user 102 (having a user device 300 such as illustrated in FIG. 3) communicates on the Internet 104, including accessing cloud services, Software-as-a-Service, etc. (each may be offered via compute resources, such as using one or more servers 200 as illustrated in FIG. 2). As part of offering cybersecurity through these example network configurations 100A, 100B, 100C, there is a large amount of cybersecurity data obtained. The present disclosure focuses on using this cybersecurity data for various purposes.

The network configuration 100A includes a server 200 located between the user 102 and the Internet 104. For example, the server 200 can be a proxy, a gateway, a Secure Web Gateway (SWG), Secure Internet and Web Gateway, Secure Access Service Edge (SASE), Secure Service Edge (SSE), etc. The server 200 is illustrated located inline with the user 102 and configured to monitor the user 102. In other embodiments, the server 200 does not have to be inline. For example, the server 200 can monitor requests from the user 102 and responses to the user 102 for one or more security purposes, as well as allow, block, warn, and log such requests and responses. The server 200 can be on a local network associated with the user 102 as well as external, such as on the Internet 104. The network configuration 100B includes an application 110 that is executed on the user device 300. The application 110 can perform similar functionality as the server 200, as well as coordinated functionality with the server 200. Finally, the network configuration 100C includes a cloud service 120 configured to monitor the user 102 and perform security-as-a-service. Of course, various embodiments are contemplated herein, including combinations of the network configurations 100A, 100B, 100C together.

The cybersecurity monitoring and protection can include firewall, intrusion detection and prevention, Uniform Resource Locator (URL) filtering, content filtering, bandwidth control, Domain Name System (DNS) filtering, protection against advanced threat (malware, spam, Cross-Site Scripting (XSS), phishing, etc.), data protection, sandboxing, antivirus, and any other security technique. Any of these functionalities can be implemented through any of the network configurations 100A, 100B, 100C. A firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The intrusion prevention and advanced threat protection can deliver full threat protection against malicious content such as browser exploits, scripts, identified botnets and malware callbacks, etc. The sandbox can block zero-day exploits (just identified) by analyzing unknown files for malicious behavior. The antivirus protection can include antivirus, antispyware, antimalware, etc. protection for the users 102, using signatures sourced and constantly updated. The DNS security can identify and route command-and-control connections to threat detection engines for full content inspection. The DLP can use standard and/or custom dictionaries to continuously monitor the users 102, including compressed and/or Secure Sockets Layer (SSL)-encrypted traffic.

In some embodiments, the network configurations 100A, 100B, 100C can be multi-tenant and can service a large volume of the users 102. Newly discovered threats can be promulgated for all tenants practically instantaneously. The users 102 can be associated with a tenant, which may include an enterprise, a corporation, an organization, etc. That is, a tenant is a group of users who share a common grouping with specific privileges, i.e., a unified group under some IT management. The present disclosure can use the terms tenant, enterprise, organization, enterprise, corporation, company, etc. interchangeably and refer to some group of users 102 under management by an IT group, department, administrator, etc., i.e., some group of users 102 that are managed together. One advantage of multi-tenancy is the visibility of cybersecurity threats across a large number of users 102, across many different organizations, across the globe, etc. This provides a large volume of data to analyze, use machine learning techniques on, develop comparisons, etc.

Of course, the cybersecurity techniques above are presented as examples. Those skilled in the art will recognize other techniques are also contemplated herewith. That is, any approach to cybersecurity that can be implemented via any of the network configurations 100A, 100B, 100C. Also, any of the network configurations 100A, 100B, 100C can be multi-tenant with each tenant having its own users 102 and configuration, policy, rules, etc.

§ 1.1 Cloud Monitoring

The cloud 120 can scale cybersecurity monitoring and protection with near-zero latency on the users 102. Also, the cloud 120 in the network configuration 100C can be used with or without the application 110 in the network configuration 100B and the server 200 in the network configuration 100A. Logically, the cloud 102 can be viewed as an overlay network between users 102 and the Internet 104 (and cloud services, SaaS, etc.). Previously, the IT deployment model included enterprise resources and applications stored within a data center (i.e., physical devices) behind a firewall (perimeter), accessible by employees, partners, contractors, etc. on-site or remote via Virtual Private Networks (VPNs), etc. The cloud 120 replaces the conventional deployment model. The cloud 120 can be used to implement these services in the cloud without requiring the physical appliances and management thereof by enterprise IT administrators. As an ever-present overlay network, the cloud 120 can provide the same functions as the physical devices and/or appliances regardless of geography or location of the users 102, as well as independent of platform, operating system, network access technique, network access provider, etc.

There are various techniques to forward traffic between the users 102 and the cloud 120. A key aspect of the cloud 120 (as well as the other network configurations 100A, 100B) is all traffic between the users 102 and the Internet 104 is monitored. All of the various monitoring approaches can include log data 130 accessible by a management system, management service, analytics platform, and the like. For illustration purposes, the log data 130 is shown as a data storage element and those skilled in the art will recognize the various compute platforms described herein can have access to the log data 130 for implementing any of the techniques described herein for risk quantification. In an embodiment, the cloud 120 can be used with the log data 130 from any of the network configurations 100A, 100B, 100C, as well as other data from external sources.

The cloud 120 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud 120 contemplates implementation via any approach known in the art.

The cloud 120 can be utilized to provide example cloud services, including Zscaler Internet Access (ZIA), Zscaler Private Access (ZPA), Zscaler Posture Control (ZPC), Zscaler Workload Segmentation (ZWS), and/or Zscaler Digital Experience (ZDX), all from Zscaler, Inc. (the assignee and applicant of the present application). Also, there can be multiple different clouds 120, including ones with different architectures and multiple cloud services. The ZIA service can provide the access control, threat prevention, and data protection. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). ZPC is a Cloud-Native Application Protection Platform (CNAPP) which is a new category of security products, encompassing the functionality previously found in Cloud Security Posture Management (CSPM) and Cloud Workload Protection Platform (CWPP) products and more. Those of ordinary skill in the art will recognize various other types of cloud services are also contemplated.

§ 1.2 Zero Trust

Figure 1B:
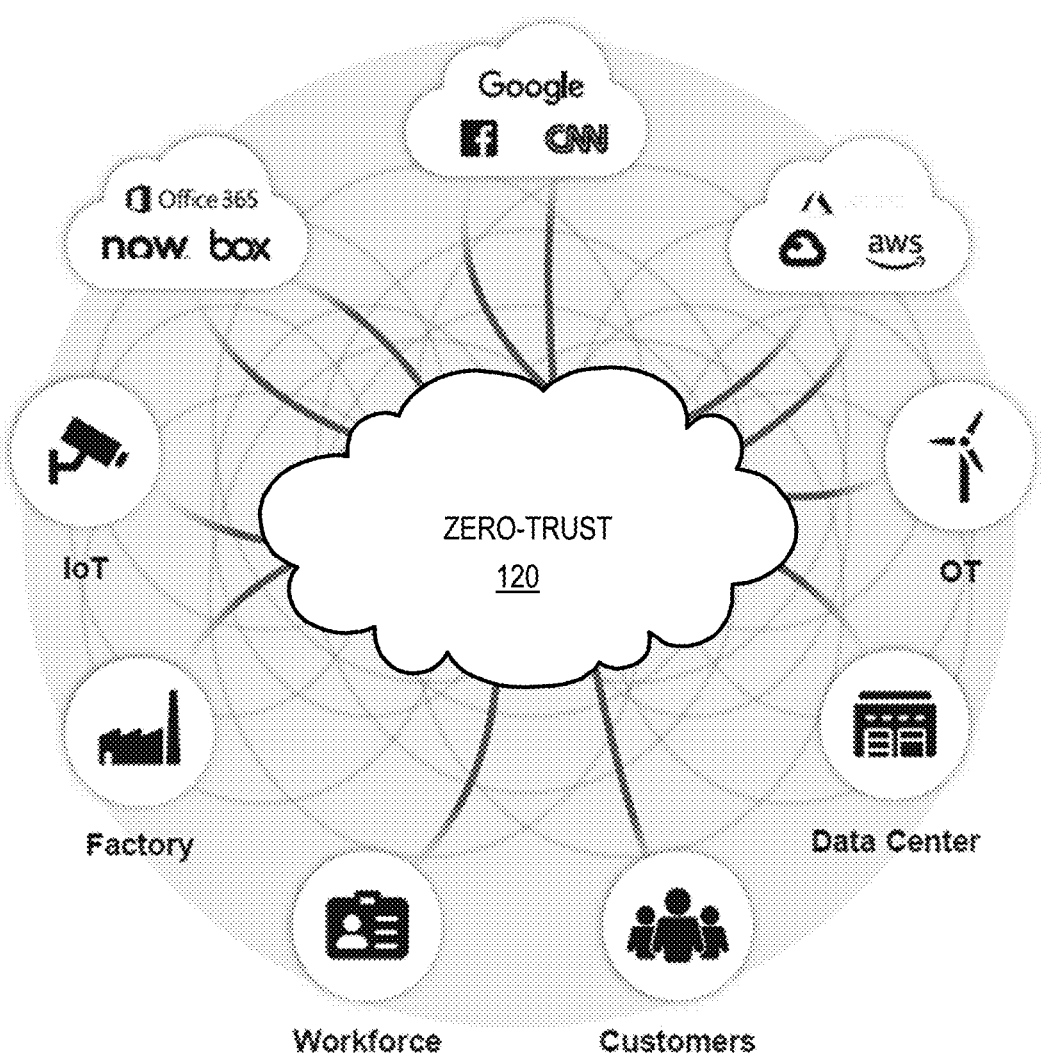
FIG. 1B is a logical diagram of the cloud in FIG. 1A operating as a zero-trust platform.

FIG. 1B is a logical diagram of the cloud 120 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud 120 Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero-trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud 120. Critically, in a zero-trust architecture, a resource's network location is not the biggest factor in its security posture anymore. Instead of rigid network segmentation, your data, workflows, services, and such are protected by software-defined micro segmentation, enabling you to keep them secure anywhere, whether in your data center or in distributed hybrid and multi-cloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero-trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero-trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

FIG. 1C is a logical diagram illustrating zero trust policies with the cloud 120 and a comparison with the conventional firewall-based approach (appliance). Zero trust with the cloud 120 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

In an example, the aspects of cybersecurity can be categorized as follows: Prevent Compromise (PC), Data Loss (DL), Lateral Movement (LM), and Asset Exposure (AE) (or attack surface). The present disclosure contemplates cybersecurity monitoring and protection in one or more of these categories, as well as across all of these categories. The PC relates to events, security configurations, and traffic flow analysis and attributes, focusing on network compromise. DL relates to analyzing and monitoring sensitive data attributes to detect and defend against potential data leakage. LM includes analyzing and monitoring private access settings and metrics to detect and defend against lateral propagation risks. Finally, AE relates to analyzing and monitoring external attack surfaces across a range of publicly discoverable variables, such as exposed servers and Autonomous System Numbers (ASNs) to detect and defend vulnerable cloud assets.

§ 1.3 Log Data

With the cloud 120 as well as any of the network configurations 100A, 100B, 100C, the log data 130 can include a rich set of statistics, logs, history, audit trails, and the like related to various user 102 transactions. Generally, this rich set of data can represent activity by a user 102 and their associated user devices 300. This information can be for multiple users 102 of a company, organization, etc., and analyzing this data can provide a current cyber risk posture of the company. Note, the term user 102 can also be widely interpreted to also mean machines, workloads, IoT devices, or simply anything associated with the company that connects to the Internet, a Local Area Network (LAN), etc.

The log data 130 can include a large quantity of records used in a backend data store for queries. A record can a collection of tens of thousands of counters. A counter can be a tuple of an identifier (ID) and value. As described herein, a counter represents some monitored data associated with cybersecurity monitoring. Of note, the log data can be referred to as sparsely populated, namely a large number of counters that are sparsely populated (e.g., tens of thousands of counters or more, and possible orders of magnitude or more of which are empty). For example, a record can be stored every time period (e.g., an hour or any other time interval). There can be millions of active users 102 or more. Examples of the sparsely populated log data can be the Nanolog system from Zscaler, Inc., the applicant. Also, descriptions of such data is described in the following:

Commonly-assigned U.S. Pat. No. 8,429,111, issued Apr. 23, 2013, and entitled "Encoding and compression of statistical data," the contents of which are incorporated herein by reference, describes compression techniques for storing such logs, Commonly-assigned U.S. Pat. No. 9,760,283, issued Sep. 12, 2017, and entitled "Systems and methods for a memory model for sparsely updated statistics," the contents of which are incorporated herein by reference, describes techniques to manage sparsely updated statistics utilizing different sets of memory, hashing, memory buckets, and incremental storage, and Commonly-assigned U.S. patent application Ser. No. 16/851,161, filed Apr. 17, 2020, and entitled "Systems and methods for efficiently maintaining records in a cloud-based system," the contents of which are incorporated herein by reference, describes compression of sparsely populated log data.

A key aspect here is the cybersecurity monitoring is rich and provides a wealth of information to determine various assessments of cybersecurity.

§ 2.0 Example Server Architecture

FIG. 2 is a block diagram of a server 200, which may be used in as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chip-set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein. Those skilled in the art will recognize the cloud 120 ultimately runs on one or more physical servers 200, virtual machines, etc. . . .

§ 3.0 Example User Device Architecture

FIG. 3 is a block diagram of a user device 300, which may be used by a user 102. Specifically, the user device 300 can form a device used by one of the users 102, and this may include common devices such as laptops, smartphones, tablets, netbooks, personal digital assistants, cell phones, e-book readers, Internet-of-Things (IoT) devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. The application 110 can be one of the example programs.

§ 4.0 Risk Monitoring

At present, there is a challenge in the process of measuring, quantifying, and remediating risk in networks. According to research, it has been found that customers manage risk through inferior third-party tools and/or manual input spreadsheets. Thus, due to the need for additional industry standards regarding network security risks and the need for better quality risk quantification tools, the systems and methods of the present disclosure provide embodiments that have the aim to address the current issues and improve the network security landscape, especially by offering one or more products that can accurately quantify or assess the effectiveness of a combination of security tools in use in a network. Currently, there are some efforts being made in this area, but an acceptable level of maturity has not yet been attained.

In particular, the present disclosure focuses on specific areas of security for reducing risk in a network. For example, some different security areas to which improvements can be directed include the fields of 1) Prevent Compromise (i.e., to prevent network compromise), 2) Lateral Movement Prevention (i.e., to prevent lateral movement attacks), 3) Data Loss Prevention, and 4) Asset Exposure Prevention (i.e., to reduce the attack surface of network resources or assets). The present disclosure addresses at least these four areas by configuring combinations of various security tools in order to quantify risk for reduction thereof. In particular, the systems and methods may be configured to perform this combined optimization by a single solution (e.g., a single hardware/software product). In some respects, this may provide network security operators or security stakeholders with a high-level view about their organization. Also, the solution described herein can give them the capability to look into various factors which can tremendously impact their risk and provide them with the necessary knowledge regarding possible areas of improvement.

The present disclosure may be configured to solve the above-stated problems, for example, by calculating the risk of a breach or attack by evaluating an organization's a) static and dynamic policy configurations, b) traffic patterns, and c) risk reduction capabilities. The present disclosure may also provide network security administrators and stakeholders with a prioritized and contextualized list of recommended changes to their deployment in order to improve their overall security posture and further mitigate their risk against all four areas of Prevent Compromise (PC), Data Loss (DL), Lateral Movement (LM), and Asset Exposure (AE) (or attack surface). Also, as a result of leveraging capabilities, the systems and methods may provide historical data allowing the user to view a company's risk score as it changes over time, which can also be compared with industry peers. In some embodiments, the Risk Score may be calculated using the following formula:

$$\text{Risk Score} = \\ \big(100 * \left(PC/\text{total\_possible\_PC}\right) + 100 * \left(DL/\text{total\_possible\_DL}\right) + \\ 100 * \left(LM/\text{total\_possible\_LM}\right) + 100 * \left(AE/\text{total\_possible\_AE}\right)\big)/4$$

That is, the Risk Score may be the average of the percentages of each of the four categories with respect to their highest possible values. Thus, the Risk Score may range from 0 to 100, in an example.

Figure 4:
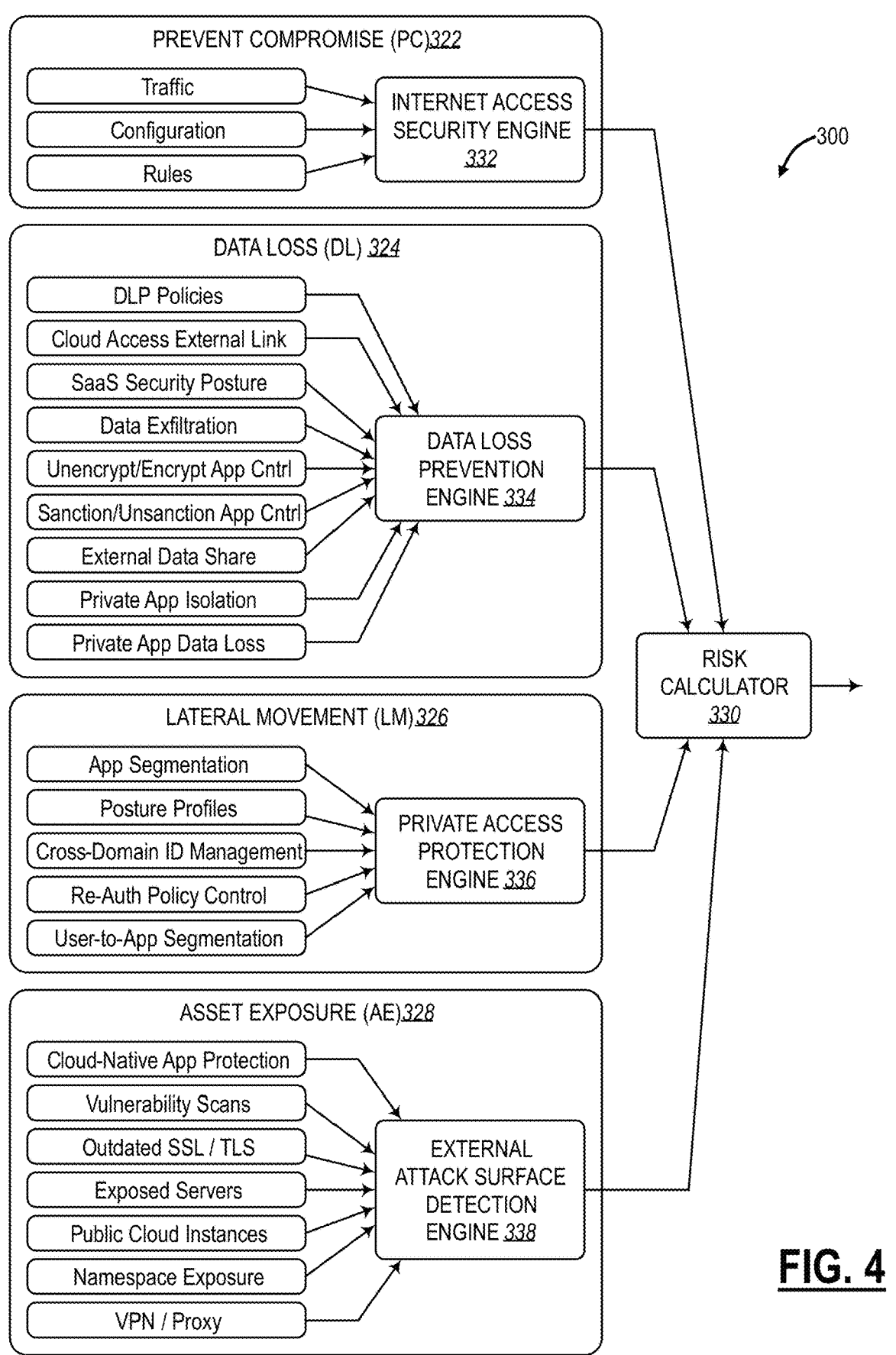
FIG. 4 is a diagram illustrating an embodiment of a system for analyzing or assessing the status of a network with respect to the four categories of Prevent Compromise (PC), Data Loss (DL), Lateral Movement (LM), and Asset Exposure (AE) and determining or quantifying risk therefrom.

FIG. 4 is a diagram illustrating an embodiment of a system 300 for analyzing or assessing the status of a network with respect to the four categories of PC, DL, LM, and AE and determining or quantifying risk therefrom. The system 300 may include any suitable combination of hardware (or physical) components and/or software/firmware (or virtual) components for performing various functions in order to obtain some calculation, determination, and/or quantification of risk, based on the log data 130. As shown in this embodiment, the system 300 includes a Prevent Compromise (PC) unit 322, a Data Loss (DL) unit 324, a Lateral Movement (LM) unit 326, and an Asset Exposure (AE) unit 328. The units 322, 324, 326, 328 are configured to provide respective outputs to a risk calculator 330, which is configured to consider each of the calculations with respect to PC, DL, LM, and AE and calculate a risk score. As described herein, the risk score is something used to quantify cyber risk. The risk score can be a number, on a scale, or anything that is meaningful to a stakeholder.

As illustrated, the PC unit 322 is configured to monitor, measure, assess, and/or obtain (in any suitable manner) elements with respect to Traffic, Configuration, and Rules and is configured to supply these elements to an Internet Access Security Engine 332. The Traffic element may include traffic related to any of Unauthenticated, Unscanned SSL, Firewall, Intrusion Prevention System (IPS), and the like. The Configuration element may include configurations related to any of Advance Threat Protection, Malware Protection, Advanced Settings, Mobile Threats, URL Filter and Cloud App Control, Browser Control, File Transfer Protocol (FTP) Control, and the like. The Rules element may include rules related to any of Inline Sandboxing, URL Filters, File Type Control, Firewall Control, Non-Web IPS Control, and the like.

The DL unit 324 is configured to monitor, measure, assess, and/or obtain (in any suitable manner) elements with respect to DLP Policies, Cloud Access Security External Links, SaaS Security Posture, Data Exfiltration, Unencrypted/Encrypted Application Control, Sanctioned/Unsanctioned Application Control, External Data Share, Private App Isolation, Private App Data Loss, and the like. These elements are configured to be supplied to a Data Loss Prevention Engine 334. The DLP Policies element may include policies related to any of Configuration, Content/Contextual Control, Violations, and the like.

The LM unit 326 is configured to monitor, measure, assess, and/or obtain (in any suitable manner) elements with respect to App Segmentation, Posture Profiles, Cross-Domain Identity Management, Re-Authorization Policy Control, User-to-App Segmentation, and the like. These elements are configured to be supplied to a Private Access Protection Engine 336. The App Segmentation element may include segmentation features related to Wide Open Port Config and the like. The Cross-Domain Identity Management element may include management features related to any of managing groups in access policies, enabling/disabling control, and the like.

The AE unit 328 is configured to monitor, measure, assess, and/or obtain (in any suitable manner) elements with respect to a Cloud-Native Application Protection Platform (CNAPP), Vulnerability Scans, Outdated SSL or TLS, Exposed Servers, Public Cloud Instances, Namespace Exposure, VPN/Proxy, and the like. These elements are configured to be supplied to an External Attack Surface Detection Engine 338.

The Internet Access Security Engine 332 is configured to output a PC security risk component to the risk calculator 330. The Data Loss Prevention Engine 334 is configured to output a DL security risk component to the risk calculator 330. The Private Access Protection Engine 336 is configured to output an LM security risk component to the risk calculator 330. Also, the External Attack Surface Detection Engine 338 is configured to output an AE security risk component to the risk calculator 330. The risk calculator 330 receives the PC security risk component, DL security risk component, LM security risk component, and the AE security risk component and is configured to calculate a risk score and/or an effectiveness score. The risk calculator 330 may store the highest possible score for each of the PC, DL, LM, and AE scores and use these as a reference to determine how well the network is able to perform with respect to each specific category.

The PC (and the associated protection from network compromise), LM (and the associated protection from lateral movement), DL (and the associated protection from data loss), and AE (and the associated protection from asset exposure or reduction of attack space) are cumulatively considered to be the focus of efforts for analyzing or assessing network status with respect to various types of attacks, breaches, etc. and then for reducing or eliminating these attacks, breaches, etc. Some security software products may have various capabilities, such as Identity and Access Management functionality, Network Services functionality, Platform Security functionality, IT Asset Management functionality, Application Security functionality, and the like.

FIG. 5 is a flowchart of a process 340 for determining the effectiveness of combination of security components for mitigating risk in a network. The process 340 contemplates implementation as a computer-implemented method having steps, via a computer or other suitable processing device or apparatus configured to implement the steps, via the cloud 120 configured to implement the steps, and as a non-transitory computer-readable medium storing instructions that, when executed, cause one or more processors to implement the steps.

The process 340 includes analyzing a network to measure security parameters associated with the use of one or more network security tools that are configured for mitigating risk with respect to network compromise (or PC), lateral movement (LM), data loss (DL), and asset exposure (AE) (step 342). Based on the measured security parameters, the process 340 includes quantifying the one or more network security tools to determine an effectiveness score defining an ability of the one or more network security tools, in combination, to counteract the network compromise, lateral movement, data loss, and asset exposure (step 344).

The process 340 may further include the steps of 1) determining one or more recommendations for changing configuration settings of the one or more network security tools in order to mitigate the risk and increase the effectiveness score and 2) displaying the effectiveness score and the one or more recommendations on a dashboard of a user interface of a computing device associated with a network security administrator. The process 340 may further include the steps of evaluating a) static and dynamic configurations of security policies offered by the one or more network security tools, b) traffic patterns associated with the network, and c) the ability of the one or more network security tools, in combination, to counteract the network compromise, lateral movement, data loss, and asset exposure. Then, in response to the evaluating step, the process 340 may calculate a security risk score indicating a current level of risk that the network faces against one or more types of attacks.

In some embodiments, the process 340 may include the step of recording a plurality of effectiveness scores over time to obtain a historical view of the network. Also, the process 340 may include the step of adjusting an insurance actuary model based on the effectiveness score. The one or more network security tools, for example, may include multiple applications and/or services supplied by multiple vendors. The effectiveness score, for example, may include a Prevent Compromise (PC) score indicative of an ability to prevent network compromise, a Lateral Movement (LM) score indicative of an ability to prevent lateral movement, a Data Loss (DL) score indicative of an ability to prevent data loss, and an Asset Exposure (AE) score indicative of an ability to reduce an attack space. The effectiveness score may be calculated based on the following formula:

$$Effectiveness\ Score =$$
$$(100 * (PC/\text{highest-possible}-PC) + 100 * (LM/\text{highest-possible}-LM) +$$
$$100 * (DL/\text{highest-possible}-DL) + 100 * (AE/\text{highest-possible}-AE))/4.$$

The network compromise, which is examined in order to quantify the one or more network security tools, may be a factor of one or more of a) traffic analysis, b) configuration analysis, and c) rules analysis. The traffic analysis may include analysis with respect to one or more of 1) unauthenticated traffic, 2) unscanned Secure Sockets Layer (SSL) traffic, 3) firewall-based traffic, and 4) traffic based on intrusion prevention. Configuration analysis may include analysis with respect to one or more of 1) advanced treat protection, 2) malware protection, 3) advanced settings, 4) mobile threats, 5) URL filters, 6) cloud app control, 7) browser control, and 8) FTP control. Rules analysis may include analysis with respect to one or more of 1) inline sandboxing, 2) URL filtering, 3) file type control, 4) firewall control, and 5) non-web intrusion prevention control.

The lateral movement, which is examined in order to quantify the one or more network security tools, may be a factor of one or more of a) app segmentation, b) posture profiles, c) cross-domain identity management, d) re-authentication policy control, and e) user-to-app segmentation. The data loss, which is examined in order to quantify the one or more network security tools, may be a factor of one or more of a) data loss prevention policies, b) cloud access security, c) Software as a Service (SaaS) security, d) data exfiltration, e) unscanned/encrypted data, f) sanctioned/unsanctioned app control, g) external data sharing, h) private app isolation, and i) private app data loss. The asset exposure, which is examined in order to quantify the one or more network security tools, may be a factor of one or more of a) cloud-native application protection, b) vulnerability, c) outdated Secure Sockets Layer (SSL) or Transport Layer Security (TLS), d) exposed servers, e) public cloud instances, f) namespace exposure, and g) Virtual Private Network (VPN) proxy.

Security service customers (e.g., companies, enterprises, etc.) are challenged in measuring, quantifying, and remediating risk. Customers often attempt to manage risk through a variety of third-party tools (e.g., vulnerability management software, attack surface reports, Global Risk and Compliance systems, simple spreadsheets etc.). At times, customers may rely on vague, manually input data in spreadsheets. There is no conventional tool or standard for risk quantification that consumes security data from a customer's environment and provides a real view of risk, although some attempts have been made. There is a need in the field of network security to utilize data around a customer's environment, including high risk activities from various entities, configuration and external attack surface data, etc. There is also a need to provide security service customers with a holistic, comprehensive, and actionable risk framework. Furthermore, by focusing on driving actionable recommendations through intuitive workflows, the systems and methods of the present disclosure are configured to help customers reduce their risk exposure. The present embodiments are configured to provide powerful concepts such as the User/Company Risk Score and Config Risk Score. In some embodiments, the underlying logic for these features can be subsumed into a new product or risk assessment model along with assessment scores of other attributes.

At the highest level, the Security Exchange Commission (SEC) and New York State Department of Financial Services, will require Board level accountability for Cybersecurity Risk Management, Strategy, Governance, and Incident Disclosure. According to embodiments described herein, the systems and methods of the present disclosure are configured to provide users (e.g., Chief Information Security Officers (CISOs) and their teams) with real-time insights into their current risk score and where they stand compared to their peers. The systems and methods also provide them with important notifications on actionable events or deviations from their baseline (e.g., in case of a policy deviation or newly discovered vulnerability). This may include providing a dashboard reporting view, providing information through real-time alerting, and/or providing reports via API exports and ingestion (e.g., from third-party data sources). The systems and methods may start with a focus on leveraging existing datasets (e.g., external attack surface reports, Internet access reports, private network access reports, etc.). The embodiments may also gradually explore enriching these data sets over time, as well as leveraging third-party data.

§ 4.1 Visualizing Risk

A User Interface may be configured to display risk by taking into account any number of contributing factors and provide one or more actionable recommendations for each contributing factor. The UI can display financial data, historic data, peer data, etc. The users may be allowed to perform certain UI actions to override certain features. It may be understood that the UI may include any suitable system and may be built to be able to take in more contributing factors and cards as they are created. Thus, using firmware downloads, these new features can be added to continue to improve the functionality of the present systems and methods.

In some embodiments, the UIs may be configured to include entity mappings and data requirements. A main entities page (e.g., for users, third-parties, applications, cloud assets, etc.) may show risky users (e.g., in a list), user risk scores, risky third parties, high-level stats, distribution of risk scores, risky locations or departments, etc. Risky third parties may access browser-based application segments, which may be an unmanaged device accessing a console or a user accessing a SaaS application via identity proxy. A risky user list may pull data from a private access service and may include username, location, risk score, etc.

The private access services and/or client connect services may include the ability to tag app segments as for third parties or B2B. Risky applications may include risky SaaS applications, which can pull data on high-risk index apps (e.g., unsanctioned, risky apps) from an IT report. It can also pull data on third party applications from an IT report. The pulled data may include default columns, applications, application categories, total bytes, users, risk indices, etc. A drawer may show the user more information from the SaaS security report. The risky private applications can include specific application segments, which may include only the top app segments (e.g., top 10 segments) that have the most policy blocks. This may also show a drawer on a diagnostics page from the private access app segment.

For unsanctioned segments, this may include shadow IT. Sanctioned segments may include 1) third party risk (or oversharing), 2) plug-ins, and/or 3) SSPM risk (e.g., incorrect settings). For example, data may be pulled on third party plug-ins from Internet access shadow IT reports. Risky assets (e.g., risky devices, workloads, Operational Technology (OT) assets, servers, cloud assets, etc.) may further be configured to be showcased as a list of risky Internet of Things (IoT) assets seen in the Internet access service. In some embodiments, this may simply be shown as a list of risky users, which may essentially be the same list as the risky users, but, instead of username, it may include device information.

If a customer's app does not have Posture Control functionality (e.g., Cloud-Native Application Protection Platform (CNAPP) or the like), then the UI may show a list of exposed servers in a public cloud namespace. The UI may list "public cloud instances" from External Attack Surface reports. In some embodiments, if a customer's app does have Posture Control functionality, then the UI may be configured to show top categories that can map to a workload, top 10 risky assets (e.g., by asset type), etc. In some embodiments, the cloud asset list may include default columns with asset name, asset type, risk level, alerts, etc. For example, assets may factor into container registries and workloads in certain ways. The systems and methods may also store additional datasets, such as by parsing subdomains of attack surface reports to fine and report specific VPN vulnerabilities, by adding additional attributes to external attack surface contributing factors based on gap analysis on what is available, what can already be leveraged, and/or what other vendors may show. Also, the additional datasets may enrich various factors (e.g., infected clients, data loss events, exposed servers, etc.) with geological IP data, which can be stored and displayed on a map included in the UI. In addition, the datasets may be obtained from various data sources, such as Posture Control apps, Deception apps, etc.

Figure 6:
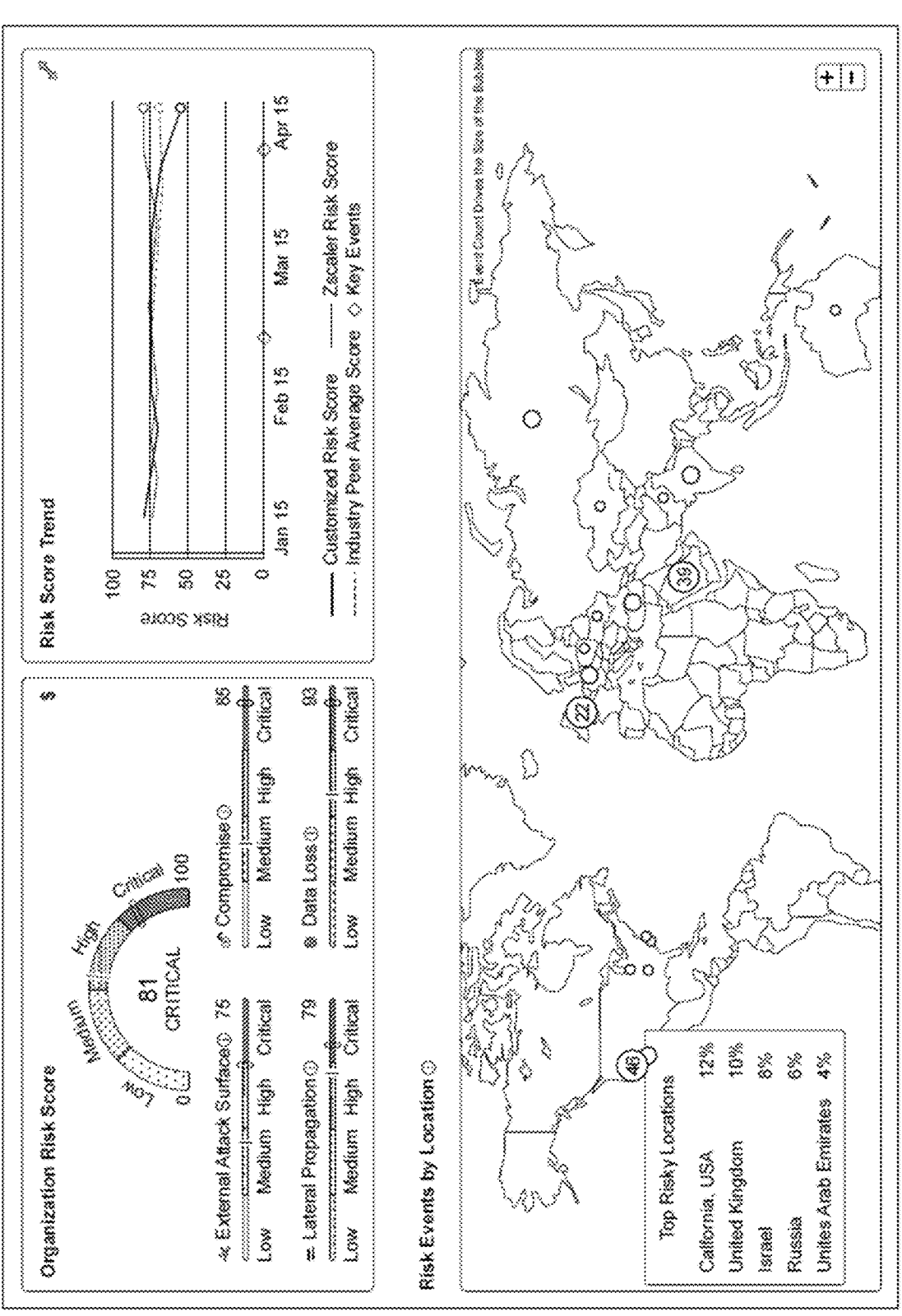
FIG. 6 is a screenshot of a user interface for displaying risk.

FIG. 6 is a screenshot of a user interface for displaying risk. The UI provides Powerful Risk Quantification, Intuitive Visualization & Reporting, and Actionable Remediation. The risk score gives a holistic risk measurement and visualization framework for remediating risk by using real data from the cloud-based system 100. Thus, the risk score processes data from various sources to provide unique, data-driven insights-several data sources (e.g., internet access configurations and traffic profiles, private access segmentation maturity, etc.) as well as external sources are used.

The risk is visualized across four stages of breach—
(1) External Attack Surface—Looks across a broad range of publicly discovery variables such as exposed servers and exposed Autonomous System Numbers (ASNs) to determine sensitive cloud assets.
(2) Prevent Compromise—Looks at a range of broad range of events, security configurations, and traffic flow attributes to compute the likelihood of compromise.

(3) Lateral Propagation—Looks at a range of private access settings and metrics and computes lateral propagation risk.

(4) Data Loss—Looks at a range of sensitive data attributes to see if data might be leaking out.

Figure 7:
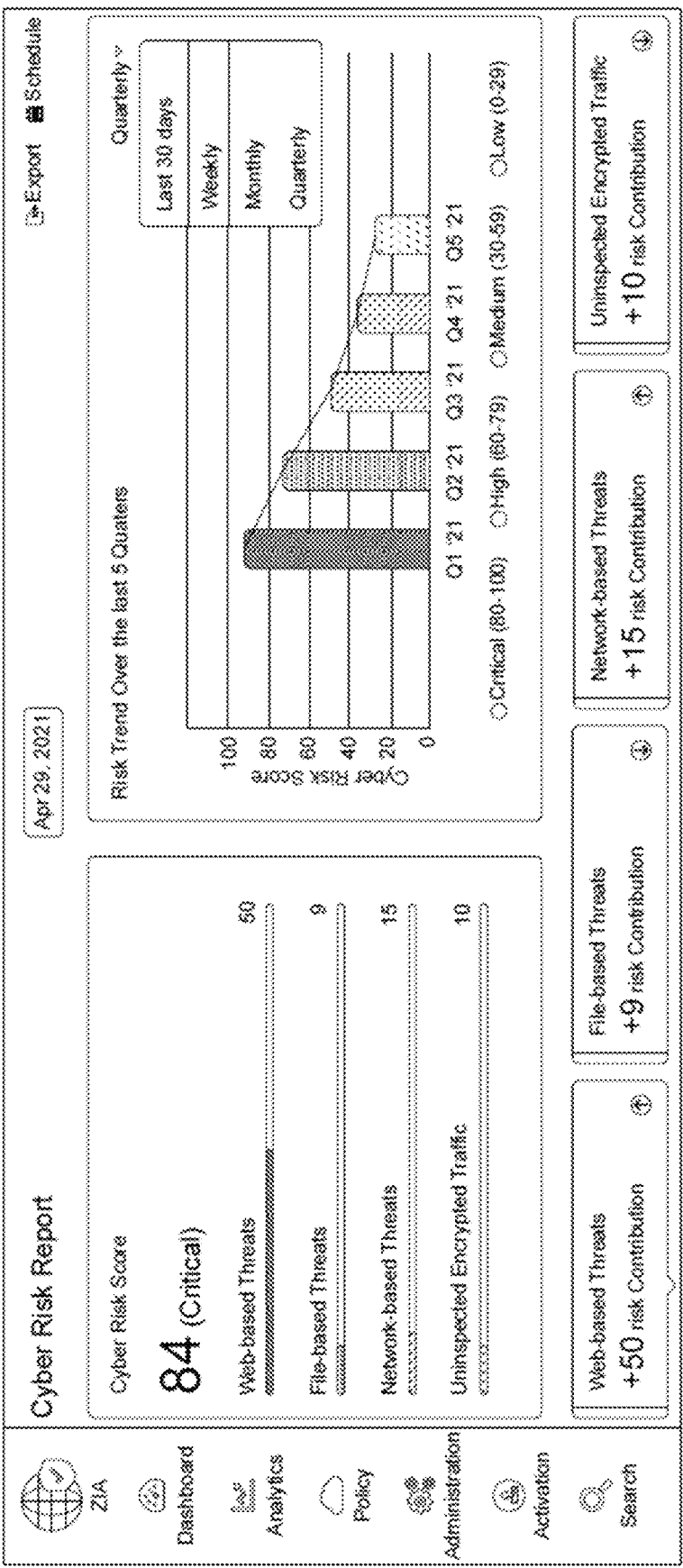

FIGS. 7-12 are a series of screenshots of another user interface for displaying a risk score. FIG. 7 is a visualization of a calculated risk score as well as a graph illustrating the trends. There are also panels for the various components in the risk score, namely Web-based Threats, File-based Threats, Network-based Threats, and Uninspected Encrypted Traffic Threats. A user may select any of the panels for additional details. FIGS. 8-12 are an example of the Web-based Threats, the File-based Threats, the Network-based Threats, and the Uninspected Encrypted Traffic Threats.

§ 5.0 Financial Modeling of Cyber Risk

The aforementioned description provides an effective methodology to quantify cyber risk technically. However, cybersecurity is not just a technical concern but a critical business issue. The ability to quantify cybersecurity risks in financial terms is pivotal for informed decision-making (e.g., what should I prioritize), technology investments (e.g., what approaches do I need), and resource allocation (e.g., where is the best place to put resources to minimize the most risk). That is, there is a need to further quantify risk in terms of what we should do about it. In addition to quantifying the risk as described above, the present disclosure includes a cutting-edge financial modeling capability designed to provide organizations with a clear, quantifiable measure of their cybersecurity risk and the associated financial implications.

The present disclosure includes risk quantification that evaluates an organization's existing security posture by analyzing data across their IT environment (e.g., the log data 130). This evaluation can generate a risk score ranging from 0 (indicating a very high security posture) to 100 (signifying the highest likelihood of suffering a cyber event). This score is used in the subsequent financial risk analysis.

§ 5.1 Challenges of Measuring Cybersecurity Risk Financially

Traditionally, quantifying cybersecurity risks in financial terms has been a complex endeavor for several reasons:

(1) Intangibility of Cyber Risks: Cyber risks often are difficult to score and measure, which leads to challenges in quantifying financial loss attributable to various technology capabilities/cyber risks.

(2) Dynamic Cyber Threat Landscape: The ever-evolving nature of cyber threats adds complexity to predicting potential financial impacts accurately.

(3) Lack of Standardized Metrics: The absence of universally accepted metrics for measuring cybersecurity risk has historically led to inconsistent and subjective assessments.

To address these challenges, the present disclosure includes a quantitative framework that combines industry-specific data with a Monte Carlo simulation approach, offering a more accurate, objective, and comprehensive financial risk assessment.

§ 5.2 Process of Financially Modeling Cyber Risk

FIG. 13 is a flowchart of a process 400 of financially modeling cyber risk. The process 400 contemplates implementation as a computer-implemented method having steps, via a computer or other suitable processing device or apparatus configured to implement the steps, via the cloud 120 configured to implement the steps, and as a non-transitory computer-readable medium storing instructions that, when executed, cause one or more processors to implement the steps.

The process 400 includes obtaining cybersecurity monitoring data for an organization where the cybersecurity monitoring data is from a plurality of sources including from cybersecurity monitoring of a plurality of users associated with the organization (step 402); determining a current cyber risk posture of the organization based on the cybersecurity monitoring data (step 404); determining inputs for a Monte Carlo simulation to characterize financial losses of the organization due to a cyber event in a predetermined time period based on (1) an associated industry of the organization, (2) a size of the organization, and (3) the current cyber risk posture of the organization (step 406); performing a plurality of trials of the Monte Carlo simulation utilizing the inputs (step 408); and displaying a risk distribution curve based on results of the plurality of trials where the risk distribution curve plots a curve of losses versus a probability (step 410).

The cybersecurity monitoring data can be based on a current security posture of the organization, and the process 400 can further include determining updated cyber risk posture for the organization utilizing mitigation factors to address the current cyber risk posture; determining updated inputs for the Monte Carlo simulation based on (1) the associated industry, (2) the size, and (3) the updated cyber risk posture; performing an updated plurality of trials of the Monte Carlo simulation utilizing the updated inputs; and displaying an updated risk distribution curve based on results of the updated plurality of trials along with the risk distribution curve based on results of the plurality of trials.

A Monte Carlo simulation is a technique which is used to estimate the possible outcomes of an uncertain event. The simulation builds a distribution of possible results by leveraging a probability distribution for any variable that has inherent uncertainty, and recalculates the results over and over, each time using a different set of random numbers to produce a large number of likely outcomes. Monte Carlo Simulations are also utilized for long-term predictions due to their accuracy. As the number of inputs increase, the number of forecasts also grows, allowing you to project outcomes farther out in time with more accuracy. When a Monte Carlo Simulation is complete, it yields a range of possible outcomes with the probability of each result occurring.

Figure 14:
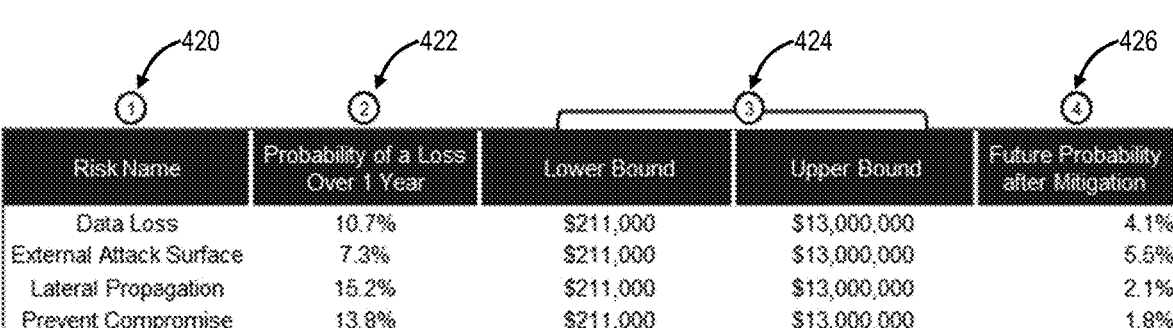
FIG. 14 is a table of example inputs for the Monte Carlo Simulation used in the process of FIG. 13.

FIG. 14 is a table of example inputs for the Monte Carlo Simulation. The inputs include cyber risks 420 (What is the organizational cyber capability effectiveness today?), probability of a loss 422 (e.g., How likely is it that the risk event occurs over one year?), bounds 424, and future probabilities 424. The bounds 424 define a lower/upper bound (confidence interval) for the financial impact of a cyber risk, i.e., In what range will the financial damages most likely be in case the risk event occurs? The future probabilities 424 assign control effectiveness, i.e., risk mitigation, i.e., How much does a better solution mitigate the potential damages based on alignment to MITRE ATT&CK framework?

We run randomized trials, for each of which an individual simulated inherent loss is calculated based on randomized risk event probability (probability of a loss 422) and a randomized financial impact (bounds 424) within the defined confidence interval. The randomized trials will generate a risk distribution curve, based on simulated losses and the probability of realizing the associated loss.

Figure 15:
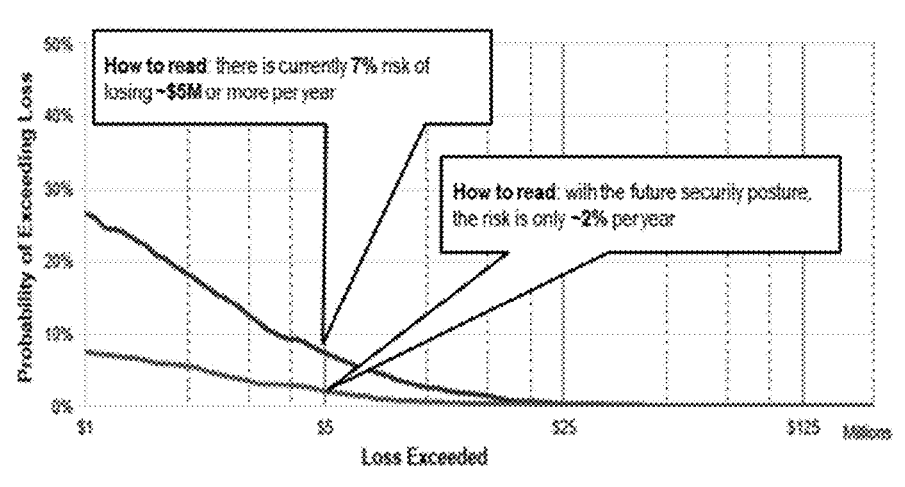
FIG. 15 is a graph of a risk distribution curve.
Figure 17:
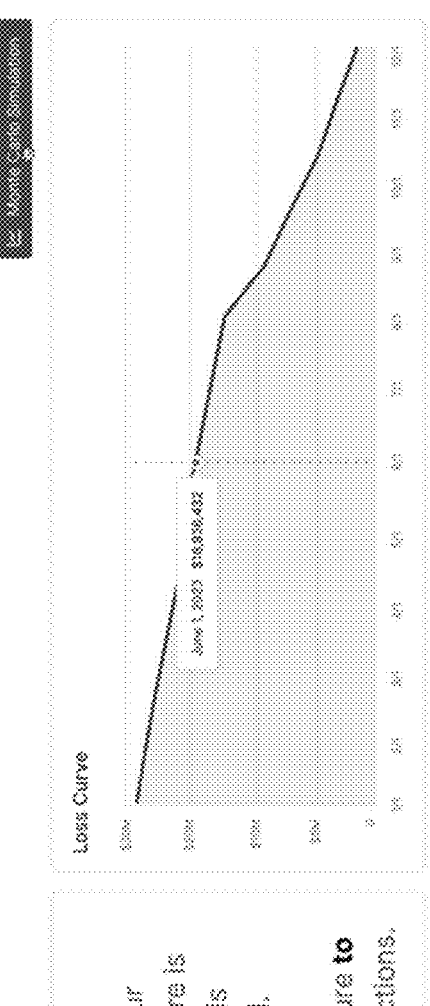
FIG. 17 is a user interface of financial risk, a summary, a loss curve, and contributing factors.
Figure 18:
FIG. 18 is a graph of a Monte Carlo simulation.
Figure 19:
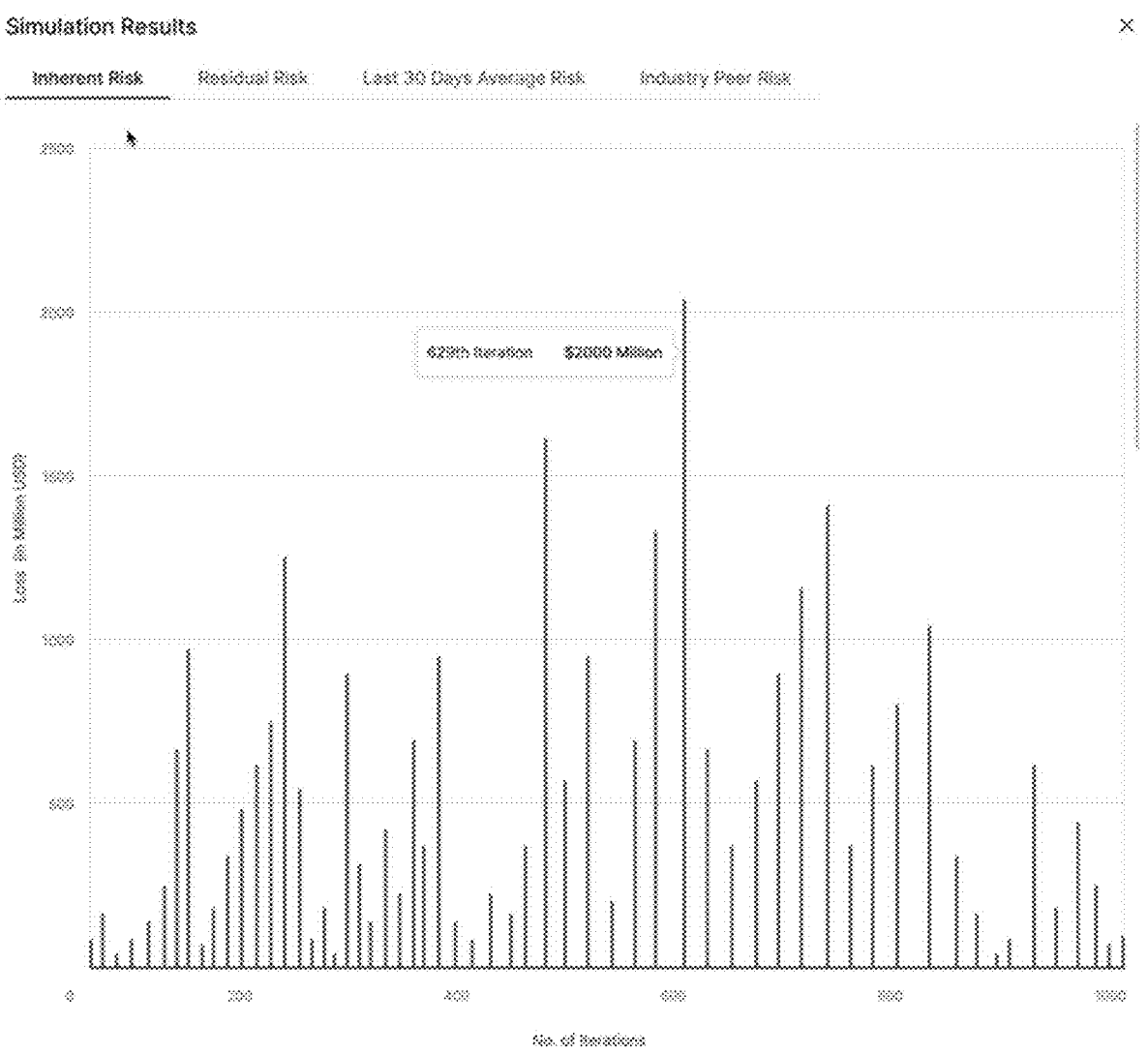
FIG. 19 is a graph of individual trial results of the Monte Carlo simulation.

The process 400 can further include identifying a plurality of risk factors in the current cyber risk posture and assigning financial exposures to the plurality of risk factors; and displaying the plurality of risk factors, the corresponding financial exposures, and recommended actions. FIG. 15 is a graph of a risk distribution curve. FIG. 16 is a table illustrating risk reduction quantification. FIG. 17 is a user interface of financial risk, a summary, a loss curve, and contributing factors. FIG. 18 is a graph of a Monte Carlo simulation. FIG. 19 is a graph of individual trial results of the Monte Carlo simulation.

The process 400 can further include performing cybersecurity monitoring of the plurality of users associated with the organization via a cloud service; and logging the cybersecurity monitoring data based on the cybersecurity monitoring. The process 400 can further include displaying a comparison of the organization to peers. For example, the cloud 120, being multi-tenant, can provide comparisons of peer organizations. Of note, peers can be anonymous. The process 400 can further include identifying and prioritizing remediation in the current cyber risk posture based on associated financial impact, such as in FIG. 17.

The current cyber risk posture can be a score based on a combination of a Prevent Compromise (PC) score indicative of an ability to prevent network compromise, a Data Loss (DL) score indicative of an ability to prevent data loss, a Lateral Movement (LM) score indicative of an ability to prevent lateral movement, and an Asset Exposure (AE) score indicative of an ability to reduce an attack space.

Network compromise, which is examined in order to quantify the one or more network security tools, is a factor of one or more of a) traffic analysis, b) configuration analysis, and c) rules analysis. Traffic analysis includes analysis with respect to one or more of 1) unauthenticated traffic, 2) unscanned Secure Sockets Layer (SSL) traffic, 3) firewall-based traffic, and 4) traffic based on intrusion prevention, configuration analysis includes analysis with respect to one or more of 1) advanced treat protection, 2) malware protection, 3) advanced settings, 4) mobile threats, 5) URL filters, 6) cloud app control, 7) browser control, and 8) FTP control, and rules analysis includes analysis with respect to one or more of 1) inline sandboxing, 2) URL filtering, 3) file type control, 4) firewall control, and 5) non-web intrusion prevention control.

Data loss, which is examined in order to quantify the one or more network security tools, is a factor of one or more of a) data loss prevention policies, b) cloud access security, c) Software as a Service (SaaS) security, d) data exfiltration, e) unscanned/encrypted data, f) sanctioned/unsanctioned app control, g) external data sharing, h) private app isolation, and i) private app data loss. Lateral movement, which is examined in order to quantify the one or more network security tools, is a factor of one or more of a) app segmentation, b) posture profiles, c) cross-domain identity management, d) re-authentication policy control, and e) user-to-app segmentation. Asset exposure, which is examined in order to quantify the one or more network security tools, is a factor of one or more of a) cloud-native application protection, b) vulnerability, c) outdated Secure Sockets Layer (SSL) or Transport Layer Security (TLS), d) exposed servers, e) public cloud instances, f) namespace exposure, and g) Virtual Private Network (VPN) proxy.

§ 6.0 Generative AI-Based Security Report Using LLMs

The aforementioned techniques provide a quantification of risk (e.g., a risk score) and a financial view of the risk. These are numerical data points. It is also beneficial to provide a C-level assessment of an organization's cybersecurity. Of course, one approach can be for a security expert to analyze the current cyber risk posture as determined herein and to write a report. However, this requires expertise. The present disclosure provides an approach using generative Artificial Intelligence (AI) to use the current cyber risk posture as input to Large Language Models (LLMs) to generate a security report for a C-level (executive) assessment. The assessment can cover four main categories: External Attack Surface, Data Loss, Compromise, and Lateral Propagation. Other embodiments can include periodic change reports and specialized reports.

In various embodiments, the present disclosure uses generative AI models to generate the security report from the current cyber risk posture and the cybersecurity monitoring data. That is, taking input data associated with cybersecurity monitoring, processing the input data with multiple LLMs, and outputting a report that provides a security assessment of an organization's current cyber risk posture. The objective is for the report to look and seem as if it were generated by a security expert, not generative AI. To that end, our approach uses a unique combination of LLMs to provide a security report that appears indistinguishable from one produced by a security expert. Also, those skilled in the art will appreciate while the approaches described herein are presented with reference to generating a security report as an example, the present disclosure contemplates the techniques described herein to generate practically any content using the unique combination of LLMs described herein.

§ 6.1 LLMs

As is known in the art, an LLM is a machine learning model configured to achieve general-purpose language understanding and generation. LLMs are trained in advance with a large amount of data to learn. Again, the objective of any generated work is to appear as if written by a human, and more particularly a human expert. What we discovered is LLMs generally have the following attributes when generating a work, e.g., a security report:

(1) Grammar is generally very good, i.e., LLMs are good at correcting and generating proper grammar.

(2) Conciseness is a problem, namely LLMs like to add "fluff" and tend to not be concise in any generated report.

(3) Tone can be exaggerated, namely LLMs tend to use harsh language, e.g., "devastating risk."

(4) Correctness in that LLMs are well-known to make up stuff, e.g., new or rarely used acronyms can be given made up meaning. This is also known as mistakes, hallucinations, etc.

To that end, we propose a framework using multiple LLMs, each having a function in preparing a security report. The framework includes ideation (original report generation by a first LLM), reflection and critique (where a second LLM critiques the ideation stage outputs), and resolution (where the critiques and the original report are combined for a final report). We have found that this framework sufficiently addresses items (2) through (4) above.

§ 6.2 Generative AI System

Figure 20:
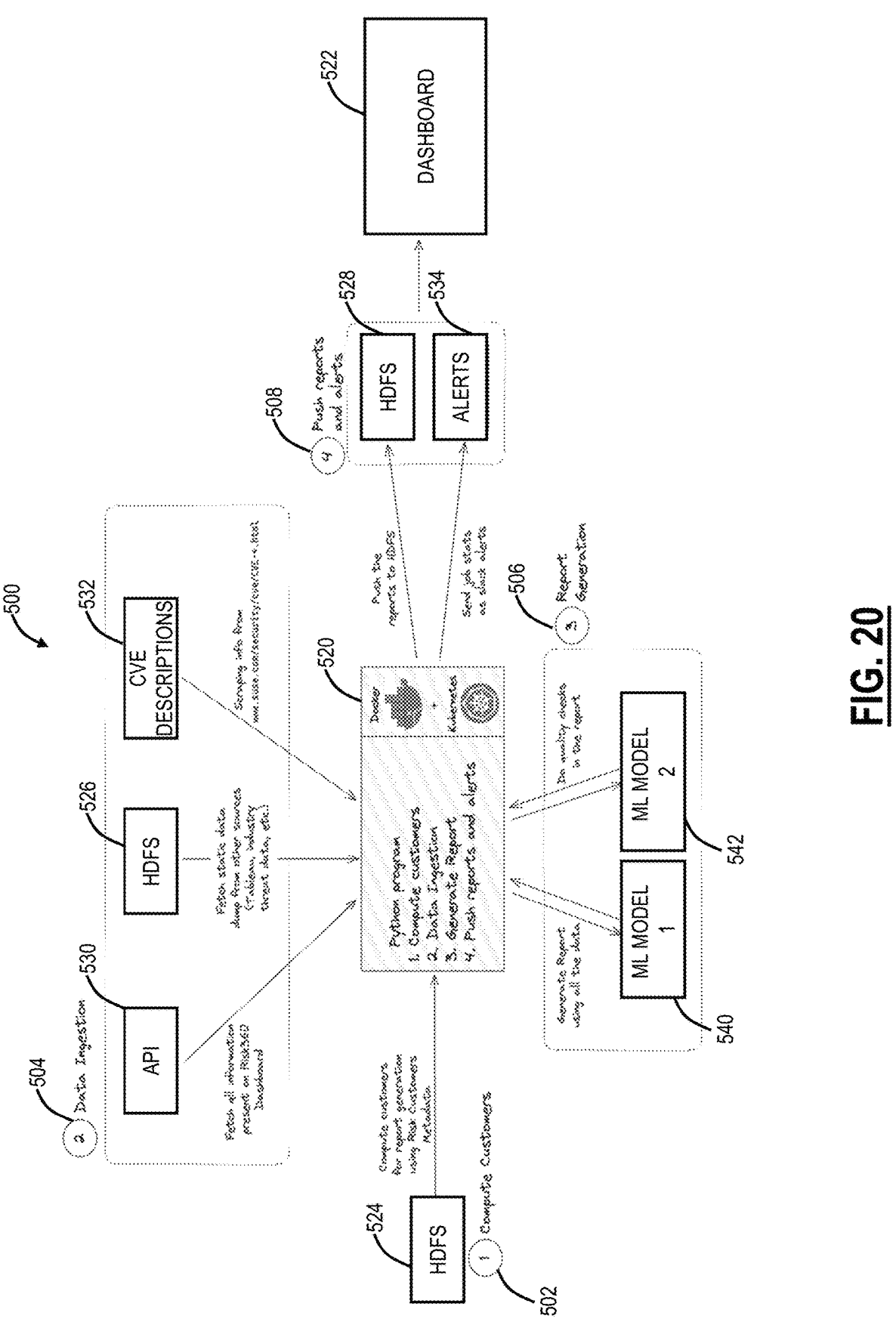
FIG. 20 is a block diagram of a generative AI system in an example embodiment.

FIG. 20 is a block diagram of a generative AI system 500 in an example embodiment. The generative AI system 500 is described both with respect to computing components and functional steps 502, 504, 506, 508. Those skilled in the art will appreciate other computing components as well as different arrangements of computing components are contemplated to implement and achieve the functional steps 502, 504, 506, 508. The steps include obtaining data for compute customers (step 502), ingesting the data (step 504), generating a report (step 506), and pushing the report and/or any alerts (step 508). Additional details for each functional step are described as follows.

The computing components include a generative AI program 520, a dashboard 522, one or more file systems 524, 526, 528, an Application Programming Interface (API) 530, Common Vulnerabilities and Exposures (CVE) descriptions 532, alerts 534, and two machine learning models 540, 542. The one or more file systems 524, 526, 528 can be a Hadoop Distributed File System (HDFS), and they can be the same HDFS or separate. The generative AI program 520 can be Python-based, operating on a docker with Kubernetes. The machine learning model 540 can be a Generative Pre-trained Transformer 4 (GPT-4)-based model, and the machine learning model 542 can be a GPT-3.5 turbo-based model. Of course, other implementations for each of the following are also contemplated.

The functional steps include obtaining and ingesting customer data (step 502, 504). The data can be obtained from various sources including customer metadata obtained from the HDFS 524, current cyber risk posture of the organization (customer) obtained from the API 530 communicating to the log data 130, peer data, industry threat data, etc. fetched from the HDFS 526, and industry threat data from updated CVE descriptions 532. Collectively this can be referred to as input data that is provided to the machine learning model 540 to generate a report.

The report generation step 506 is configured to generate the security report. In an embodiment, we use a template to generate the security report (details described herein). The report generation step 506 utilizes the framework of ideation, critique, and resolve. For each point, we pass the relevant input data into a Large Language Model (LLM) and ask it to use the data to create the desired output. The three-step framework is used to make sure the results are higher quality. This is described in detail as follows, but generally uses a modified version of an LLM chain, and specifically SmartLLMChain (available at api.python.lang-chain.com/en/latest/smart_llm/langchain_experimental-.smart_llm.base.SmartLL MChain.html, the contents of which are incorporated by reference. An LLM chain of LLM models that adds functionality around the models 540, 542.

The ideation stage is performed by the machine learning model 540 to create an initial output. The critique stage includes an input set of rules or logic for the machine learning model 542 to follow. The machine learning model 542 is a separate LLM from the machine learning model 540 and is configured to critique the initial output by checking for various predefined flaws and stating what was done correctly (so the resolver does not make similar mistakes). The resolve stage takes the output from the critique stage and the ideation stage and resolves them into a final output.

The final output can be provided as a report, stored in the HDFS 528, displayed on the dashboard 522. For example, the report can be text from the generative AI program 520 which is converted into an HTML format and then into a PDF. Of course, other embodiments are contemplated. The alerts 534 can be push notifications, Slack alerts, etc.

FIG. 21 is a diagram of the three-stage framework if ideation, reflection/critique, and resolver.

§ 6.3 Section-Wise Template with Embedded Logic

In an embodiment, the security report has predefined sections with logic configured to determine how each section is constructed. That is, the machine learning models 540, 542 are preconfigured to generate data based on a template with specific logic. The following describes an example of the template and associated logic.

There are five sections—executive summary (see FIG. 22 for an example of an executive summary generated as described herein). The executive summary includes:

a. Intro sentence
b. One paragraph explaining the risk scores compared to peers. For the scores that differ the most from peers, give the reason why.
c. Cybersecurity fundamental summary (Internet access monitoring, sandbox, etc.)
d. Private application segmentation
e. Conclusion—summarize the above sections, and mention the top two to three factors causing a high risk score The External Attack Surface Risk section includes:
a. Intro paragraph—note the positive progress and the places to improve
    i. Places to improve are the other factors
b. Bullet for CVEs detected (limit of one)
c. Sentence for exposed servers detected (limit of two)
d. Bullets point recommendations for public cloud/ namespace exposure
e. Paragraph—recommendations for VPNs, exposed/outdated servers, and CVEs The Compromise Risk section includes:
a. Intro paragraph—note the positive progress and the places to improve. Explicitly mention the % of SSL traffic that needs to still be inspected
b. foundational steps (how many risky domains bypassed, URL category traffic, botnets detected)
c. Industry trend data/summary/comparison to the current company
d. Bullet recommendations to summarize top 10 remaining factors/recommendations for the company The Lateral Propagation section includes:
a. Intro paragraph—note the positive progress and the places to improve. Explicitly mention app segment/ policy stats and percentage of apps configured if they exist
b. Bullet recommendations for factors that have a high risk score The Data Loss section includes:
a. Intro paragraph—note the positive progress and the places to improve. Conditionally (if less than 50% DLP policy configured compared to peers) add a sentence for DLP policy configuration as well.
b. Summarize 1-2 examples of risky app usage (exfiltration, file share) if more than 50 MB or data was uploaded for an app.
c. Bullet recommendations for factors with high-risk score
d. Outro sentence:

Of note, the foregoing sections and logic apply to a security report. Of course, using the generative AI techniques described herein for other types of documents can use different sections and logic accordingly. For example, a later section in this disclosure describes preparing SEC disclosures related to cybersecurity and the same approaches described herein for the security report can be used to prepare the SEC disclosures.

§ 6.4 Custom LLM Chain

Although the initial inspiration was taken from SmartLL-MChain in langchain (which in turn was introduced here github.com/langchain-ai/langchain/pull/4816which pinpoints the origin), the component needed to be customized.

SmartLLMChain was created to come up with various ideas for the original prompt (by setting high initial temperatures) and test for any logical flaws which might be present in the generated ideas. Then a final response would be created which takes the best idea, fixes any detected logic flaws and tries to make the response better.

In the use case of the present disclosure, the LLM is not really looking for different ideas. The objective is for the output to be as stable as possible, to ensure robustness and have another layer of guardrails to protect against LLM not following nuanced linguistic and domain-oriented instructions. To that end, the LLM Chain is modified to focus on a single idea, look for violations in pre-defined linguistic and other domain-oriented rules, and only change the idea to fix found violations (instead of making the entire answer better; this at times ended up modifying the original answer in undesirable ways).

§ 6.5 Details About the Reflection Stage

The Reflection/Critique Basic Prompt to the machine learning model 542 can be—You are a linguistic expert and cybersecurity professional tasked with investigating the response options (or ideas) provided. List the 1. Flaws,
2. grammatical errors,
3. wordy sentences,
4. passive voice misuses of provided answer option(s),
5. any instances of not following given directions or any statement in the notes section (if one is provided).
6. places where specific linguistic instructions have been followed correctly. Let's work this out in a step-by-step way to be sure we have all the errors.

Of note, we ask for the LLM for the machine learning model 542 to identify the places where it performed well. Without this, the LLM can be prone to make up places where it did poorly even though it did not.

The other thing that the reflection does, is take the ideation stage prompt, and make sure those instructions were followed. If not, it points them out. Without this, the resolver often ended up outputting something against the instructions in cases the ideation stage output was consistent with the instructions (and there was nothing to critique-→nothing for resolver to fix).

§ 6.6 Example

Output of the ideation stage:

Idea 1: XYZ, Inc. exhibits a lower risk of lateral propagation compared to its peers, with a risk indicator of 56.6 against the per average of 67.6. The firm has made significant strides in application segmentation, achieving a 70% ratio with 2,991 out of 2,979 recent applications now within the secure confiners of 228 segments; however, it must address the remaining 886 unsegmented applications to bolster its cyber defenses further. Proactive measures, such as integrating SCIM groups into 51 access policies and deploying decoys have been instrumental in managing risks effectively. To enhance security posture, XYZ, Inc. should enable application inspection for threat scanning and implement device posture in all application segments while restricting ports to minimize the risk of attacks.

Critiques:

Analyzing the provided response options:

1. Flaws

The response mentions "risk indicator," which could imply a score, contradicting the instruction to avoid explicitly mentioning "score" after the initial comparison.

The phrase "the firm has made significant strides" could be interpreted as an investigation into the company's progress, which we need to avoid stating or implying.

2. Grammatical Errors
There are no apparent grammatical errors in the provided response.

3. Wordy Sentences
The sentence starting with "The firm has made significant strides ..." is lengthy and could be simplified for clarity and conciseness.

4. Passive Voice Misuses:
There are no misuses of passive voice in the provided response.

5. Instances of Not Following Given Directions or Any Statement in the Notes Section:
The direction to not use convoluted sentences may not have been fully adhered to due to the wordiness of some sentence. The instruction to not mention or imply that the company has investigated something was not followed correction with phrases like "made significant strides" and "managing risks effectively."

6. Places Where Specific Linguistic Instructions Have Been Followed Correctly:
  Numbers are properly formatted (e.g., 2,093 out of 2,979)
  Technical terms are used without definitions or explanations, adhering to instructions.
  The paragraph does not have a closing sentence as per instructions.
In summary, while there are no grammatical errors and some instructions have been followed correctly, there are instances where directions regarding simplicity and implications of investigation were not fully adhered to.
Resolution:
XYZ, Inc. stands at a lower risk level with a 56.5 measure compared to the peer averages of 67.6. With 70% of recent applications now within 228 secure segments, the company must still transition 886 unsegmented applications to enhance its cybersecurity posture. The integration of SCIM groups into access policies and the strategic deployment of decoys have effectively managed existing risks. To further solidify its defenses, XYZ, Inc. should activate threat scanning for private applications and enforce device posture across all application segments, coupled with port restrictions to reduce attack susceptibility.

§ 6.7 Generative AI Process

FIG. 23 is a flowchart of a process 550 for using Large Language Models (LLMs) to generate an Artificial Intelligence (AI) report on security risk using the cybersecurity data. The process 550 contemplates implementation as a computer-implemented method having steps, via a computer or other suitable processing device or apparatus configured to implement the steps, via the cloud 120 configured to implement the steps, and as a non-transitory computer-readable medium storing instructions that, when executed, cause one or more processors to implement the steps.

The process 550 includes obtaining cybersecurity monitoring data for an organization where the cybersecurity monitoring data is from a plurality of sources including from cybersecurity monitoring of a plurality of users associated with the organization (step 552); inputting the cybersecurity monitoring data to a first Large Language Model (LLM) to generate an initial output for a security report (step 554); inputting the initial output to a second LLM for critiquing the initial output against a set of rules to check for predefined flaws and to check for what was done correctly to generate a critique (step 556); resolving the initial output and the critique to generate a final output (step 558); and providing the final output for the security report (step 560).

The resolving can be performed by a third LLM, each of the first LLM, the second LLM, and the third LLM are configured in a chain. The LLM can be configured to generate the initial output based on a template having a plurality of sections, each section having a predefined structure and one or more rules for generation thereof. The critique can include a list of both flaws in the initial output and places in the initial output performed correctly.

The set of rules to check for predefined flaws can include explicit instructions to check to determine whether the first LLM performed correctly. The set of rules to check for predefined flaws can include grammar, conciseness, and passive voice. The set of rules to check for what was done correctly can include explicit instructions to check to determine whether the first LLM performed correctly.

§ 7.0 Automating SEC Disclosures

The rapid advancement of technology has led to an increasing number of cybersecurity incidents that pose significant risks to organizations, their stakeholders, and the general public. Recognizing the importance of transparent and timely reporting of such incidents, the U.S. Securities and Exchange Commission (SEC) announced on Jul. 26, 2023, that it has adopted final rules regarding cybersecurity disclosure requirements for public companies. These rules mandate the disclosure of material cybersecurity incidents and information related to cybersecurity risk management, strategy, and governance.

Key takeaways from this requirement include

Timely incident reporting: New Item 1.05 of Form 8-K requires reporting of material cybersecurity incidents within four business days, promoting swift transparency. Failure to timely file will not impact Form S-3 eligibility.

Limited reporting delay for security: Possible delay in disclosure for national security risks with U.S. Attorney General's approval, up to 120 days with SECconsent.

Comprehensive incident disclosures: Incomplete Form 8-K data requires acknowledgment and later amendment filing, reducing redundancy.

Broadened incident definition: Final rules broaden "cybersecurity incident" to include related unauthorized events, for a more holistic view.

Annual risk reporting (Form 10-K): Beginning with annual reports for fiscal years ending on or after Dec. 15, 2023, Regulation S-K Item 106 mandates yearly reporting on cybersecurity risk, strategy, governance, board oversight—without mandatory disclosure of board members' expertise.

Foreign Private Issuers The rules require comparable disclosures by foreign private issuers on Form 6-K for material cybersecurity incidents and on Form 20-Ffor cybersecurity risk management, strategy, and governance.

Compliance timing: Effective 30 days post Federal Register publication. Timelines will vary according to the size of a company.

These new SEC regulations require publicly traded companies to include cybersecurity risk management, strategy, governance, and incident disclosures in their annual filings.

Accordingly, in various embodiments, the present disclosure includes approaches to assist companies in cybersecurity reporting, using the log data 130. That is, the present disclosure can help companies comply with these requirements, leveraging the log data 130.

In an embodiment, the log data 130 can be cyber risk quantification [CRQ] and used as a starting point for these disclosures. By leveraging data from the CRQ and including this data in pre-built disclosures, customers can comply with the SEC regulations in a robust manner. By providing a robust starting point that leverages data being pulled from our in-line CRQ, customers are in a unique position to satisfy these SEC regulations with a reduced level of effort, and increased granularity and accuracy.

In another embodiment, the LLM techniques described herein can be used for SEC cyber risk disclosures. That is, the template can be adjusted from a security report to SEC disclosures.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including software and/or firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," "a circuit configured to," "one or more circuits configured to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Further, the various elements, operations, steps, methods, processes, algorithms, functions, techniques, circuits, etc. described herein contemplate use in any and all combinations with one another, including individually as well as combinations of less than all of the various elements, operations, steps, methods, processes, algorithms, functions, techniques, circuits, etc.

What is claimed is:

1. A method comprising steps of:
    obtaining cybersecurity monitoring data for an organization where the cybersecurity monitoring data is from a plurality of sources including from cybersecurity monitoring of a plurality of users associated with the organization;
    determining a current cyber risk posture of the organization based on the cybersecurity monitoring data, wherein the current cyber risk posture is a score based on a combination of a Prevent Compromise (PC) score indicative of an ability to prevent network compromise, a Data Loss (DL) score indicative of an ability to prevent data loss a Lateral Movement (LM) score indicative of an ability to prevent lateral movement, and an Asset Exposure (AE) score indicative of an ability to reduce an attack space;
    determining inputs for a Monte Carlo simulation to characterize financial losses of the organization due to a cyber event in a predetermined time period based on (1) an associated industry of the organization, (2) a size of the organization, and (3) the current cyber risk posture of the organization;
    performing a plurality of trials of the Monte Carlo simulation utilizing the inputs; and
    displaying a risk distribution curve based on results of the plurality of trials where the risk distribution curve plots a curve of losses versus a probability.

2. The method of claim 1, wherein the cybersecurity monitoring data is based on a current security posture of the organization, and wherein the steps further include:
    determining updated cyber risk posture for the organization utilizing mitigation factors to address the current cyber risk posture;
    determining updated inputs for the Monte Carlo simulation based on (1) the associated industry, (2) the size, and (3) the updated cyber risk posture;
    performing an updated plurality of trials of the Monte Carlo simulation utilizing the updated inputs; and
    displaying an updated risk distribution curve based on results of the updated plurality of trials along with the risk distribution curve based on results of the plurality of trials.

3. The method of claim 1, wherein the steps further include:
    identifying a plurality of risk factors in the current cyber risk posture and assigning financial exposures to the plurality of risk factors; and
    displaying the plurality of risk factors, the corresponding financial exposures, and recommended actions.

4. The method of claim 1, wherein the steps further include:
    performing cybersecurity monitoring of the plurality of users associated with the organization via a cloud service; and
    logging the cybersecurity monitoring data based on the cybersecurity monitoring.

5. The method of claim 1, wherein the steps further include:
    displaying a comparison of the organization to peers.

6. The method of claim 1, wherein the steps further include:
    identifying and prioritizing remediation in the current cyber risk posture based on associated financial impact.

7. The method of claim 1, wherein network compromise, which is examined in order to quantify the one or more network security tools, is a factor of one or more of a) traffic analysis, b) configuration analysis, and c) rules analysis.

8. The method of claim 7, wherein
    traffic analysis includes analysis with respect to one or more of 1) unauthenticated traffic, 2) unscanned Secure Sockets Layer (SSL) traffic, 3) firewall-based traffic, and 4) traffic based on intrusion prevention,
    configuration analysis includes analysis with respect to one or more of 1) advanced treat protection, 2) malware protection, 3) advanced settings, 4) mobile threats, 5) URL filters, 6) cloud app control, 7) browser control, and 8) FTP control, and
    rules analysis includes analysis with respect to one or more of 1) inline sandboxing, 2) URL filtering, 3) file type control, 4) firewall control, and 5) non-web intrusion prevention control.

9. The method of claim 1, wherein data loss, which is examined in order to quantify the one or more network security tools, is a factor of one or more of a) data loss prevention policies, b) cloud access security, c) Software as a Service (SaaS) security, d) data exfiltration, e) unscanned/encrypted data, f) sanctioned/unsanctioned app control, g) external data sharing, h) private app isolation, and i) private app data loss.

10. The method of claim 1, wherein lateral movement, which is examined in order to quantify the one or more network security tools, is a factor of one or more of a) app segmentation, b) posture profiles, c) cross-domain identity management, d) re-authentication policy control, and e) user-to-app segmentation.

11. The method of claim 1, wherein asset exposure, which is examined in order to quantify the one or more network security tools, is a factor of one or more of a) cloud-native application protection, b) vulnerability, c) outdated Secure Sockets Layer (SSL) or Transport Layer Security (TLS), d) exposed servers, e) public cloud instances, f) namespace exposure, and g) Virtual Private Network (VPN) proxy.

12. Medium A non-transitory computer-readable comprising instructions that, when executed, cause one or more processors to perform steps of:
    obtaining cybersecurity monitoring data for an organization where the cybersecurity monitoring data is from a plurality of sources including from cybersecurity monitoring of a plurality of users associated with the organization;
    determining a current cyber risk posture of the organization based on the cybersecurity monitoring data, wherein the current cyber risk posture is a score based on a combination of a Prevent Compromise (PC) score indicative of an ability to prevent network compromise, a Data Loss (DL) score indicative of an ability to prevent data loss a Lateral Movement (LM) score indicative of an ability to prevent lateral movement, and an Asset Exposure (AE) score indicative of an ability to reduce an attack space;
    determining inputs for a Monte Carlo simulation to characterize financial losses of the organization due to a cyber event in a predetermined time period based on (1)

an associated industry of the organization, (2) a size of the organization, and (3) the current cyber risk posture of the organization;

performing a plurality of trials of the Monte Carlo simulation utilizing the inputs; and displaying a risk distribution curve based on results of the plurality of trials where the risk distribution curve plots a curve of losses versus a probability.

13. The non-transitory computer-readable medium of claim 12, wherein the cybersecurity monitoring data is based on a current security posture of the organization, and wherein the steps further include:

determining updated cyber risk posture for the organization utilizing mitigation factors to address the current cyber risk posture;

determining updated inputs for the Monte Carlo simulation based on (1) the associated industry, (2) the size, and (3) the updated cyber risk posture;

performing an updated plurality of trials of the Monte Carlo simulation utilizing the updated inputs; and displaying an updated risk distribution curve based on results of the updated plurality of trials along with the risk distribution curve based on results of the plurality of trials.

14. The non-transitory computer-readable medium of claim 12, wherein the steps further include:

identifying a plurality of risk factors in the current cyber risk posture and assigning financial exposures to the plurality of risk factors; and displaying the plurality of risk factors, the corresponding financial exposures, and recommended actions.

15. The non-transitory computer-readable medium of claim 12, wherein the steps further include:

performing cybersecurity monitoring of the plurality of users associated with the organization via a cloud service; and logging the cybersecurity monitoring data based on the cybersecurity monitoring.

16. The non-transitory computer-readable medium of claim 12, wherein the steps further include:

displaying a comparison of the organization to peers.

17. The non-transitory computer-readable medium of claim 12, wherein the steps further include:

identifying and prioritizing remediation in the current cyber risk posture based on associated financial impact.

18. The non-transitory computer-readable medium of claim 12, wherein network compromise, which is examined in order to quantify one or more network security tools, is a factor of one or more of a) traffic analysis, b) configuration analysis, and c) rules analysis.

* * * * *